United States Patent
Jun et al.

(10) Patent No.: US 10,806,107 B2
(45) Date of Patent: Oct. 20, 2020

(54) WATER CULTURE BLOCK AND WATER CULTURE DEVICE HAVING SAME

(71) Applicants: Hyochan Jun, Uiwang-si (KR); Jonghyun Jun, Auckland (NZ)

(72) Inventors: Hyochan Jun, Uiwang-si (KR); Jonghyun Jun, Auckland (NZ)

(*) Notice: Subject to any disclaimer, the term of this patent is extended or adjusted under 35 U.S.C. 154(b) by 180 days.

(21) Appl. No.: 15/809,921

(22) Filed: Nov. 10, 2017

(65) Prior Publication Data
US 2018/0077885 A1   Mar. 22, 2018

Related U.S. Application Data

(63) Continuation of application No. PCT/KR2016/005048, filed on May 13, 2016.

(30) Foreign Application Priority Data

May 13, 2015 (KR) .................. 10-2015-0066474
Jul. 10, 2015 (KR) .................. 10-2015-0098123
Nov. 11, 2015 (KR) .................. 10-2015-0157859

(51) Int. Cl.
*A01G 31/06* (2006.01)
*A01G 31/02* (2006.01)
(Continued)

(52) U.S. Cl.
CPC ............. *A01G 31/06* (2013.01); *A01G 9/022* (2013.01); *A01G 27/00* (2013.01); *A01G 27/003* (2013.01);
(Continued)

(58) Field of Classification Search
USPC ...... 47/86, 82, 83, 59 R, 61, 62 R, 62 C–63, 47/65, 65.5, 65.9
See application file for complete search history.

(56) References Cited

U.S. PATENT DOCUMENTS 1,077,423 A * 11/1913 Myers .................. A47G 7/047
 47/67
1,977,827 A * 10/1934 Kneller .................. A01G 27/04
 47/81
(Continued)

FOREIGN PATENT DOCUMENTS

JP   H06003050 U2   1/1994
KR   10-0250160   6/2000
(Continued)

OTHER PUBLICATIONS

International Search Report issued in application No. PCT/KR2016/005048 dated Aug. 8, 2016.
(Continued)

*Primary Examiner* — Andrea M Valenti
(74) *Attorney, Agent, or Firm* — Knobbe Martens Olson & Bear LLP

(57) ABSTRACT

The described technology relates to a water culture block, which can be stacked in multiple stages along a wall surface, and a water culture device having the same. The water culture block can include a block body including side plates each having an opening, and a bottom plate connected to the side plates to form a receiving space, and at least one overflow tube having a hollow portion and configured to pass through the bottom plate to communicate an inside of the block body with an outside thereof. The water culture block can also include a water tray body formed at an upper portion of the block body and having a through hole for providing a fluid to the receiving space, and a pipe in communication with the through hole and coupled to the water tray body to support the water tray body on the bottom plate.

16 Claims, 20 Drawing Sheets

(51) Int. Cl.
*A01G 27/00* (2006.01)
*A01G 31/00* (2018.01)
*A01G 9/02* (2018.01)

(52) U.S. Cl.
CPC .............. *A01G 31/00* (2013.01); *A01G 31/02* (2013.01); *Y02P 60/216* (2015.11)

(56) References Cited

U.S. PATENT DOCUMENTS

| | | | | |
|---|---|---|---|---|
| 3,576,088 | A * | 4/1971 | Arca | A01G 27/04 47/81 |
| 3,975,860 | A * | 8/1976 | Harned | A01G 9/02 47/81 |
| 5,042,197 | A * | 8/1991 | Pope | A01G 9/02 47/71 |
| 5,058,319 | A * | 10/1991 | Liao | A01G 27/04 47/79 |
| 5,426,889 | A * | 6/1995 | Buora | A01G 27/04 47/79 |
| 5,535,542 | A * | 7/1996 | Gardner | A01G 27/04 47/18 |
| 5,644,868 | A * | 7/1997 | Lui | A01G 27/06 47/79 |
| 5,826,375 | A * | 10/1998 | Black | A01G 9/023 47/67 |
| 6,247,269 | B1 * | 6/2001 | Valiquette | A01G 31/02 47/81 |
| 6,622,430 | B1 * | 9/2003 | Lai | A01G 27/005 47/79 |
| 10,076,085 | B2 * | 9/2018 | Holby | A01G 9/02 |
| 2003/0123704 | A1 * | 7/2003 | Farmer | G06K 9/00369 382/103 |
| 2005/0274073 | A1 * | 12/2005 | Brooke | A01G 31/02 47/59 R |
| 2010/0064581 | A1 * | 3/2010 | Johnson | A01G 25/167 47/79 |
| 2010/0313474 | A1 * | 12/2010 | Williams | A01G 9/023 47/65.7 |

FOREIGN PATENT DOCUMENTS

| | | |
|---|---|---|
| KR | 10-0609496 B1 | 7/2006 |
| KR | 20-0436615 Y1 | 9/2007 |
| KR | 10-0830330 B1 | 5/2008 |
| KR | 10-2012-0060087 A | 6/2012 |
| KR | 10-1315283 B1 | 9/2013 |

OTHER PUBLICATIONS

Notice of Allowance issued in Korean application No. 10-2015-0098123 dated Feb. 4, 2016.

* cited by examiner

WATER CULTURE BLOCK AND WATER CULTURE DEVICE HAVING SAME

CROSS-REFERENCE TO RELATED APPLICATIONS

This application is a continuation application, and claims the benefit under 35 U.S.C. §§ 120 and 365 of PCT Application No. PCT/KR2016/005048, filed on May 13, 2016, which is hereby incorporated by reference. PCT/KR2016/005048 also claimed priority from Korean Patent Applications Nos. 10-2015-0066474 filed on May 13, 2015, 10-2015-0098123 filed on Jul. 10, 2015 and 10-2015-0157859 filed on Nov. 11, 2015, each of which is hereby incorporated by reference.

BACKGROUND

Field

The described technology generally relates to a water culture block, and more particularly, to a water culture block capable of being stacked in multiple stages to be used as an art wall and enabling cultivation of different kinds of plants in each of water culture blocks stacked in multiple stages, and a water culture device having the same.

Description of the Related Technology

Generally, water culturing refers to a cultivation method for growing a plant in a culture solution containing water and water-soluble nutrients without using soil such as dirt.

Since a plant suitable for water culturing is grown in a container in which the culture solution is received, water culturing has the advantage in that it is easy to observe a growth process of the plant and a root condition of the plant and it is possible to cultivate the plant easily and cleanly at home.

Example of prior arts for water culturing may include Korean Patent Registration No. 10-0250160 entitled "Water Culture and Purification Device using Aquarium Fish Tank".

A water culture and purification device using an aquarium fish tank provides water in the aquarium fish tank to a cultivation tank using a submersible pump to allow a plant to be cultivated in the water and provides the water in the cultivation tank to the aquarium fish tank again through a filter to perform indoor humidification with air purification.

In the water culture and purification device using the aquarium fish tank, sagging of a plant may be prevented by supporting the plant using a plant-support fixture and by extending the plant-support fixture as the plant grow.

However, the above-described water culture and purification device using the aquarium fish tank has a problem in that it is difficult to use this device as an art wall for decorating a living room or a wall surface of a room and it is difficult to stack in layers and independently grow different kinds of plants.

SUMMARY

One aspect is a water culture block capable of being stacked in multiple stages along a wall surface to be used as an art wall and enabling cultivation of different kinds of plants in each of water culture blocks stacked in multiple stages and allow water provided to an uppermost water culture block to flow into a lowermost water culture block to more easily perform water culturing, and a water culture device having the same.

Another aspect is a water culture block including a block body including side plates having an opening, and a bottom plate connected to the side plates to form a receiving space; at least one overflow tube having a hollow portion formed therein and configured to pass through the bottom plate to communicate an inside of the block body with an outside thereof; a water tray body formed at an upper portion of the block body and having a through hole formed therein for providing a fluid to the receiving space; and a pipe configured to be in communication with the through hole and coupled to the water tray body to support the water tray body on the bottom plate, wherein the pipe has a hollow portion formed therein and is in communication with the through hole, and any one of a cut-out portion and a hole, which is in communication with the hollow portion of the pipe, is formed at an end portion of the pipe which is in contact with the bottom plate.

The water tray body may be assembled in or disassembled from the inside of the block body.

The overflow tube may include a plurality of first overflow tubes disposed on the bottom plate in two rows along a first direction; and a plurality of second overflow tubes disposed on the bottom plate in two rows along a second direction intersecting the first direction.

Among the overflow tubes, an upper end of the overflow tube disposed in the receiving space may be disposed at a location above a lower end of the opening formed in the side plate, and the overflow tube has a pair of oblique line-shaped or V-shaped cut-out portions formed therein at locations below the lower end of the opening to allow water to flow easily into the overflow tube.

The water tray body may include a water tray bottom plate having the through hole formed therein; and a water tray side plate formed on the water tray bottom plate to form a receiving space on an upper portion of the water tray bottom plate.

A plurality of overflow tubes may be disposed in the form of a matrix at a central portion of the bottom plate and the water tray bottom plate may be formed in the shape of a rectangular band and have an opening through which the overflow tube disposed on the central portion is exposed.

A plurality of overflow tubes may be disposed in the form of a cross on the bottom plate, and the water tray bottom plate may cover the overflow tube and have a plurality of openings formed thereon.

The water tray body may include a water tray bottom plate having a plate shape and disposed to face the bottom plate, and a side surface of the water tray bottom plate may be in contact with an inner surface of the side plate.

The water culture block may further include a plurality of engagement protrusions protruding from an outer surface of the bottom plate.

The water culture block may further include an escape-prevention plate inserted between the overflow tubes and configured to press roots of a plant received in the receiving space to prevent an escape of the plant.

A through hole may be formed at least one side of the opening formed on the side plates.

The water culture block may further include a connection string connecting a pair of through holes formed at both sides of the opening.

The block body may be configured to have any one of a regular hexahedron shape and a rectangular parallelepiped shape.

The water culture block may further include an overflow tube plug including a closing portion configured to be inserted into any one of the overflow tubes to block the overflow tube, and a head formed on an upper end of the closing portion.

The overflow tube may include a first overflow unit having the hollow portion formed therein and passing through the bottom plate of the block body; and a second overflow unit assembled to the first overflow unit.

The pipe may include a first pipe coupled to a lower surface of the water tray body corresponding to the through hole; and a second pipe assembled to the first pipe.

Another aspect is a water culture device including a plurality of stacked water culture blocks, each including a block body including side plates each having an opening, and a bottom plate connected to the side plates to form a receiving space, at least one overflow tube having a hollow portion formed therein and configured to pass through the bottom plate to communicate an inside of the block body with an outside thereof, a water tray body formed at an upper portion of the block body and having a through hole formed therein for providing a fluid to the receiving space, and a pipe configured to be in communication with the through hole and coupled to the water tray body to support the water tray body on the bottom plate, wherein the pipe has a hollow portion formed therein and is in communication with the through hole, and any one of a cut-out portion and a hole, which is in communication with the hollow portion of the pipe, is formed at an end portion of the pipe which is in contact with the bottom plate; a water reservoir disposed at a lowermost water culture block of the water culture blocks and configured to store the fluid; and a circulation unit including a pump provided for pumping the fluid in the water reservoir and a hose connected to the pump to provide the fluid pumped by the pump to an uppermost water culture block of the water culture blocks.

The water culture device may further include a fish tank disposed between the water culture blocks and having an overflow tube formed on a bottom plate thereof.

Yet another aspect is a water culture block including a block body including side plates each having an opening and at least one catching jaw formed thereon, and a bottom plate connected to the side plates to form a receiving space; an overflow tube having a hollow portion formed therein and configured to pass through the bottom plate to communicate an inside of the block body with an outside thereof; and an escape-prevention plate seated on an upper surface of the catching jaw so as not to overlap the overflow tube and configured to press roots of a plant received in the receiving space to prevent an escape of the plant.

The block body may have a plurality of engagement protrusions formed thereon and protruding from an outer surface of the bottom plate.

The plurality of overflow tubes may be disposed in the form of a matrix at a central portion of the bottom plate.

The escape-prevention plate may be formed in a cross shape and located between the overflow tubes disposed in the form of a matrix.

The water culture block may further include a discharge hose coupled to a lower portion of the overflow tube to discharge a fluid which flows out of the block body through the overflow tube to the outside.

The overflow tube may include a first overflow unit having the hollow portion formed therein and passing through the bottom plate of the block body; and a second overflow unit assembled to the first overflow unit.

The water culture block may further include an overflow tube plug including a closing portion coupled to an upper portion of the overflow tube and configured to be inserted into the hollow portion of the overflow tube, and a head formed on an upper end of the closing portion.

At least one pair of through holes may be formed in one side of the side plate, and the block body may further include a connection string connecting the pair of through holes.

Yet another aspect is a water culture device including a plurality of stacked water culture blocks each including a block body including side plates each having an opening and at least one catching jaw formed thereon, and a bottom plate connected to the side plates to form a receiving space, an overflow tube having a hollow portion formed therein and configured to pass through the bottom plate to communicate an inside of the block body with an outside thereof, and an escape-prevention plate seated on an upper surface of the catching jaw so as not to overlap the overflow tube and configured to press roots of a plant received in the receiving space to prevent an escape of the plant; a water reservoir disposed at a lowermost water culture block of the water culture blocks and configured to store a fluid; and a circulation unit including a pump provided for pumping the fluid in the water reservoir and a supply hose connected to the pump to provide the fluid pumped by the pump to an uppermost water culture block of the water culture blocks.

According to at least one of the disclosed embodiments, the water culture block and the water culture device are advantageous in that water culturing is more easily and cleanly performed, the water culture block may be stacked in multiple stages, and in particular, may be applied to an art wall used on a wall surface or to a wall of room, or may be embodied with a three-dimensional shape, and it is possible to individually provide a plant to each of water culture blocks stacked in multiple stages.

Further, the water culture block and the water culture device are advantageous in that a water tray for receiving water falling from an upper side and a block body in which a plant and water are received are manufactured to be assemblable so that the water tray and the block body may be easily mass-manufactured, and it is possible to prevent the water tray and the block body from being damaged during a manufacturing process thereof and to selectively replace only damaged part when a part of the water tray and the block body is damaged.

The water culture block and the water culture device include a block body having side plates on which at least one catching jaw is formed, and an escape-prevention plate seated on the catching jaw so that root portion of a plant received in a receiving space may be stably pressed to prevent an escape of the plant.

In addition, the water culture block and the water culture device include a discharge hose coupled to a lower portion of an overflow tube to discharge a fluid flowing out of the block body through the overflow tube to the outside so that, when water culture blocks are stacked in multiple stages, it is possible to provide a fluid discharged from an upper water culture block to a desired water culture block among lower water culture blocks or to connect the water culture device to another adjacent culture device.

Accordingly, in the water culture block and the water culture device according to embodiments, unused culture blocks may be used for other purposes by adjusting a flow of the fluid in a desired direction.

DETAILED DESCRIPTION

Figure 1:
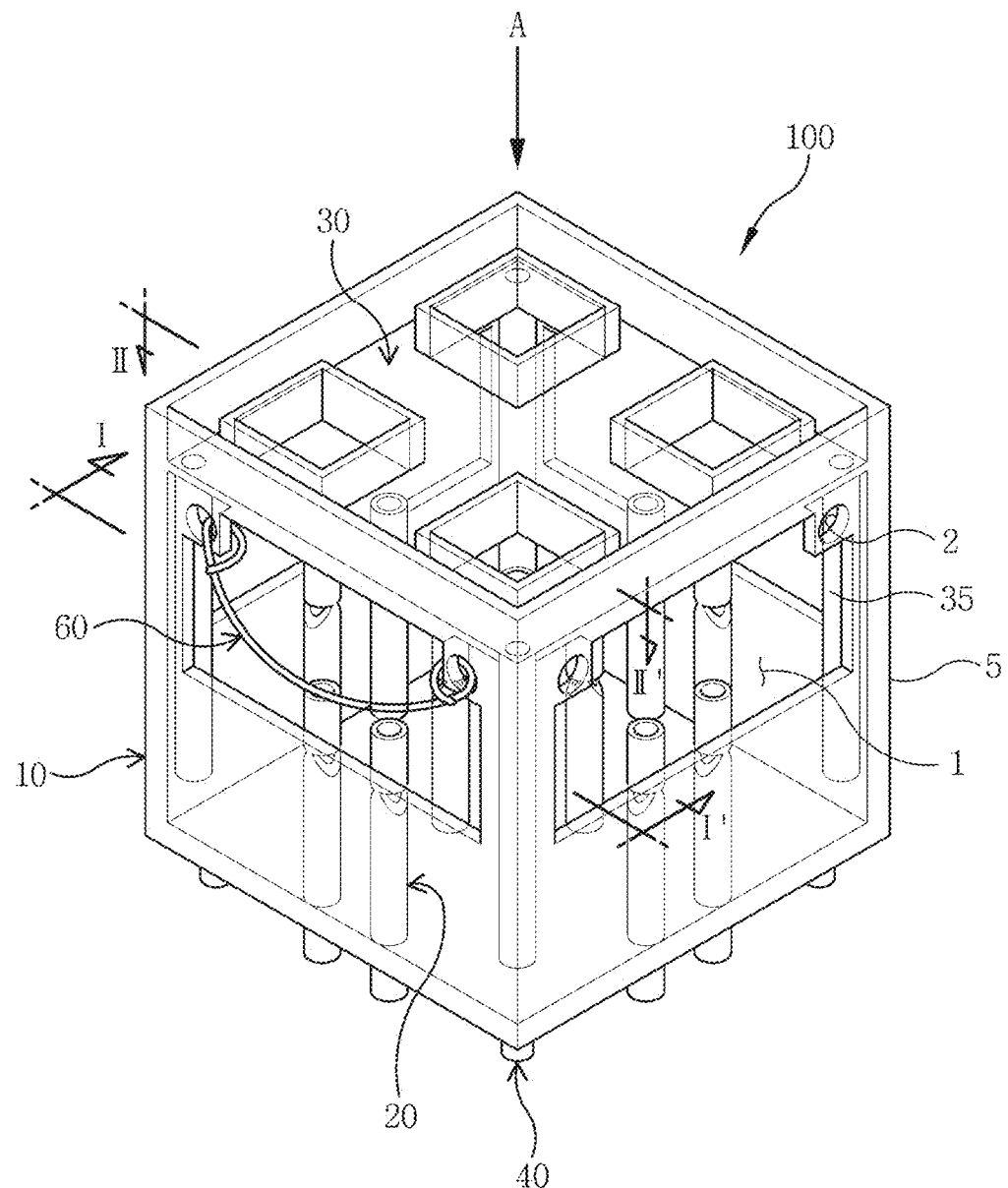
FIG. 1 is a perspective view of a water culture block according to a first embodiment of the present invention.

It should be understood that, in the following description, only parts necessary for understanding embodiments of the present invention will be described and descriptions of other parts will be omitted so as not to obscure the gist of the present invention.

The terms or words used in the detailed description and claims are not to be construed as limited to ordinary or dictionary meanings, but should be construed as having meanings and concepts consistent with the technical idea of the present invention on the basis of the principle that the inventors can appropriately define the terms or words as the conception of terminology to describe their invention in the best way. Therefore, it should be understood that, since the embodiments described in the detailed description and the configurations shown in the drawings are not intended to represent all of the technical ideas of the present invention, there may be various equivalents and variations thereto.

Figure 2:
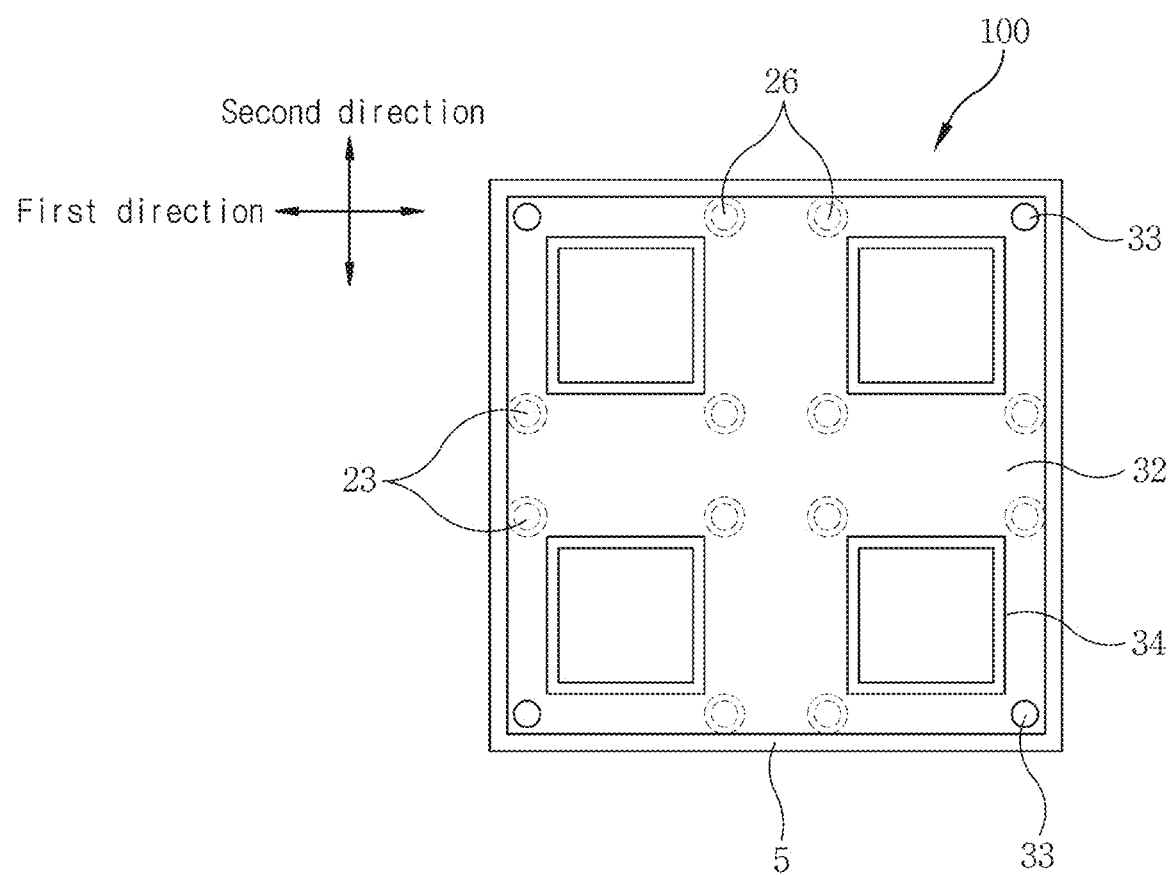
FIG. 2 is a front view in a direction A of FIG. 1.
Figure 3:
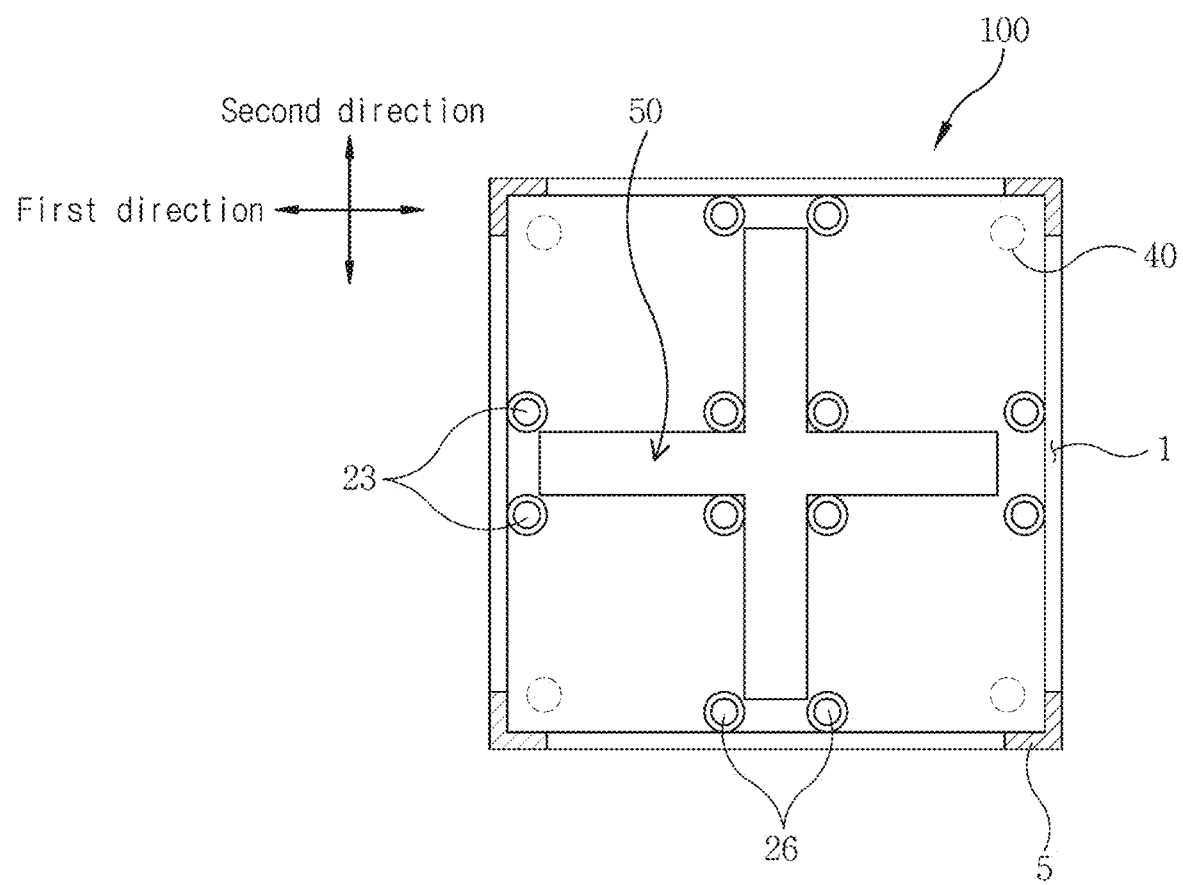
FIG. 3 is a cross-sectional view taken along line I-I' in FIG. 1.
Figure 4:
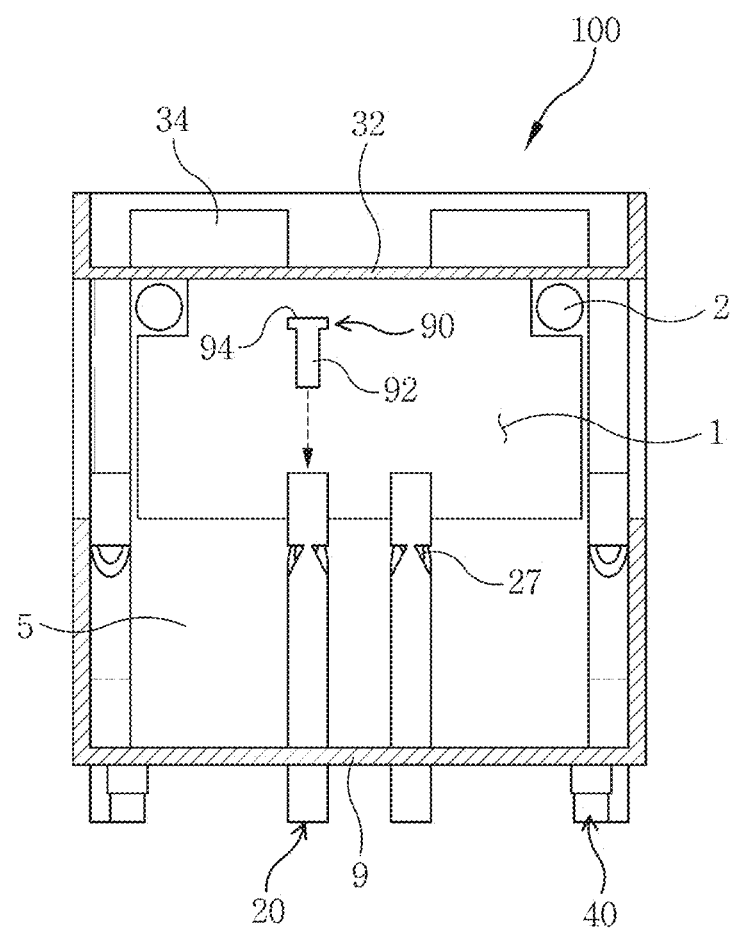
FIG. 4 is a cross-sectional view taken along line II-II' in FIG. 1.

FIG. 1 is a perspective view of a water culture block according to a first embodiment of the present invention, FIG. 2 is a front view in a direction A of FIG. 1, FIG. 3 is a cross-sectional view taken along line I-I' in FIG. 1, and FIG. 4 is a cross-sectional view taken along line II-II' in FIG. 1.

Referring to FIGS. 1 to 4, a water culture block 100 includes a block body 10, an overflow tube 20, a water tray part 30, and an engagement protrusion 40. In addition to the above, the water culture block 100 may include an escape-prevention plate 50 (see FIG. 3) and a connection string 60.

The block body 10 may have a three-dimensional shape having a receiving space formed therein and an open upper face. For example, the block body 10 may be formed to have an open hexagonal-shaped upper face or to have an open rectangular-shaped upper face. In addition to the above shape, the block body 10 may be formed to have an open pentagonal-shaped upper face, or may be formed in a truncated cone shape having an open upper face, a semi-spherical shape having an open upper face, a cylindrical shape having an open upper face, or the like.

The block body 10 may be formed of a transparent synthetic resin material such that leaves, stems, and roots of a plant growing in the block body 10 may be observed. Alternatively, the block body 10 may be formed of a metal material which has no transparency but has high durability and is not easily corroded.

The block body 10 may be manufactured by assembling a plurality of pre-fabricated pieces, may be manufactured as a single body by an injection process, or may be manufactured by folding and welding a metal plate.

The block body 10 may be waterproofed so that water or a culture solution received in the block body 10 is not leaked.

In the first embodiment of the present invention, the block body 10 has a hexahedral shape including a bottom plate 9 and a plurality of side plates 5 which each have an open upper portion (see FIG. 4).

For example, the block body 10 includes four side plates 5 and one bottom plate 9. The four side plates 5 and the one bottom plate 9 of the block body 10 may be assembled with each other or formed integrally with each other.

In the first embodiment of the present invention, an opening 1 is individually formed in each of the side plates 5, and the plant may be provided in the block body 10 or a part of the plant may be withdrawn to the outside of the block body 10 through the opening 1.

When the opening 1 is formed in each of the side plates 5, different plants may be individually provided in the block body 10 in different directions of the block body 10.

In the first embodiment of the present invention, the opening 1 may be formed in an intermediate portion between an upper and a lower end of the side plate 5, and a lower end of the opening 1 is formed at an appropriate location at which a sufficient amount of water or culture solution is filled in the block body 10.

On the other hand, through holes 2 are formed in both upper side portions of each of the side plate 5 adjacent to an upper end of the opening 1, and the through holes 2 formed in the side plates 5 facing each other among the side plates 5 are formed to face each other.

The through holes 2 adjacent to both sides of the opening 1 of the side plate 5 are provided to allow the block body 10 to be secured to a wall through nails or the like.

The connection string 60 is coupled to the through holes 2 adjacent to both of the sides of the opening 1 formed in the side plate 5.

The connection string 60 connecting the through holes 2 to each other is disposed across the opening 1, and when the connection string 60 traverses the opening 1 and is coupled to the through holes 2, the connection string 60 prevents a plant inserted into the opening 1 from sagging or escaping from the opening 1.

In the first embodiment of the present invention, the block body 10 may improve aesthetics or may be utilized as lighting by replacing the connection string 60 with an electric wire and installing a light bulb on the electric wire.

Referring to FIGS. 2 and 3, the overflow tube 20 is coupled to the bottom plate 9 connected to the side plates 5 of the block body 10.

In the first embodiment of the present invention, at least one or a plurality of overflow tubes 20 may be formed to pass through the bottom plate 9 of the block body 10.

The overflow tube 20 passing through the bottom plate 9 has both ends thereof open and has a hollow tube shape.

The plurality of overflow tubes 20 may be disposed in the form of a matrix on the bottom plate 9.

Specifically, the plurality of overflow tubes 20 may be arranged in the form of a matrix on a central portion of the bottom plate 9.

Alternatively, as shown in FIGS. 2 and 3, the overflow tube 20 may include first overflow tubes 23 formed in two rows along a first direction of the bottom plate 9, and second overflow tubes 26 formed in two rows along a second direction perpendicular to the first direction.

The overflow tube 20 prevents the water or culture solution supplied to the block body 10 from overflowing to the outside of the block body 10 through the opening 1 formed in the side plate 5.

An upper end of the overflow tube 20 disposed inside the block body 10 may be disposed at a location above the lower end of the opening 1 formed in the side plate 5, as shown in FIG. 4. When the upper end of the overflow tube 20 is disposed at a location higher than the lower end of the opening 1 formed in the side plate 5 as described above, the water or culture solution may overflow through the opening 1.

In order to prevent the above overflow, an oblique line-shaped or V-shaped cut-out portion 27 is formed on a lateral side of the overflow tube 20, and the cut-out portion 27 is formed at a location below the lower end of the opening 1 formed in the side plate 5 of the block body 10.

In the first embodiment of the present invention, when a water level of the water or culture solution provided to the block body 10 is adjusted through an opening formed at the upper end of the overflow tube 20, the opening at the upper end of the overflow tube 20 is easily blocked by surface tension so that the water or culture solution may overflow through the opening 1 of the side plate 5. However, when the cut-out portion 27 is formed on the lateral side of the overflow tube 20, the water or culture may be discharged from the inside of the block body 10 to the outside through the overflow tube 20 regardless of clogging of the opening of the upper end of the overflow tube 20.

In the first embodiment of the present invention, a pair of cut-out portions 27 may be formed on the overflow tube 20 at the same height. In contrast with the above, a plurality of cut-out portions 27 may be formed on the overflow tube 20 at mutually different heights.

Referring to FIG. 3, the escape-prevention plate 50 is formed in a plate shape, and the escape-prevention plate 50 may be disposed in association with the overflow tubes 20.

The escape-prevention plate 50 presses roots of a plant provided at the inside of the block body 10 through the opening 1 of the side plate 5 to prevent the plant from escaping through the opening 1 of the side plate 5.

The escape-prevention plate 50 is formed in a shape suitable for being inserted into spaces between the first overflow tubes 23 disposed in two rows and between the second overflow tubes 26 disposed in two rows, as shown in FIG. 3.

For example, the escape-prevention plate 50 is formed in the form of a plate having a cross shape suitable for insertion between the first overflow tubes 23 and between the second overflow tubes 26.

Although, the escape-prevention plate 50 having the cross shape suitable for insertion between the first overflow tubes 23 and between the second overflow tubes 26 is illustrated and described in the first embodiment of the present invention, the escape-prevention plate 50 may be alternatively manufactured in various shapes.

In particular, a protrusion part protruding in a direction toward at least one of the first and second overflow tubes 23 and 26 may be formed on a part of the escape-prevention plate 50, and a through hole coupled with at least one of the first and second overflow tubes 23 and 26 may be formed in this protrusion part.

Unlike the above configuration, the escape-prevention plate 50 may be formed in a square plate shape and may include through holes into which the first and second overflow tubes 23 and 26 formed in a central portion of the bottom plate 9 are inserted.

In order to allow the escape-prevention plate 50 having the square plate shape to be easily coupled to and separated from the overflow tube 20, any one of the through holes formed in the escape-prevention plate 50 having the square plate shape has a diameter allowing the overflow tube 20 to be inserted thereinto, and a diameter of the remaining through holes 52 is somewhat greater than a diameter of the overflow tube 20.

By forming the through holes formed in the escape-prevention plate 50 to have different sizes, it is possible to more easily couple and separate the escape-prevention plate 50.

Even though the water culture block 100 according to the first embodiment of the present invention may use one water culture block, the water culture block has a structure suitable for stacking a plurality of water culture blocks 100.

In order to stack the above plurality of the water culture blocks 100, a technique capable of firmly connecting the stacked water culture blocks 100 to each other and a technique for preventing generation of noise when water or a culture solution is provided to the water culture block 100 disposed at an upper side and then the water or culture solution falls into the water culture block 100 disposed at a lower side are required.

In the first embodiment of the present invention, in order to prevent the generation of noise when the water or culture solution is provided to the water culture block 100 disposed at the upper side of the stacked water culture blocks 100 and then the water or culture solution falls into the water culture block 100 disposed at the lower side, the water culture block 100 includes the water tray part 30, as shown in FIGS. 1 and 2.

The water tray part 30 having a water tray shape is formed on the side plate 5 and the water tray part 30 receives water or a culture solution discharged through the overflow tube 20 and provides the water or culture solution to the inside of the block body 10.

The water tray part 30 is formed in a trench shape and includes a water tray bottom plate 32 and a water tray side plate 34 to form the water tray part 30.

The water tray bottom plate 32 is formed in a plate shape, and the water tray bottom plate 32 covers each of the overflow tubes 20.

The water tray side plate 34 is vertically coupled to the water tray bottom plate 32 on an upper of the water tray bottom plate 32. In the first embodiment of the present invention, the water tray side plates 34 are disposed on the water tray bottom plate 32 in the form of a rectangular frame, and a space suitable for insertion of an engagement protrusion, which will be described below, or the overflow tube 20 is formed between the water tray side plate 34 and the side plate 5.

The space formed by the water tray side plates 34 and the water tray bottom plate 32 accommodates a certain volume of water or culture solution, and the water or culture solution provided in the water tray part 30 including the water tray side plates 34 and the water tray bottom plate 32 is provided to the inside of the block body 10 formed below the water tray part 30.

To achieve this function, a through hole 33 is formed in the water tray bottom plate 32 and a water pipe 35 is formed on a lower surface of the water tray bottom plate 32 corresponding to the through hole 33. The water pipe 35 is formed in a tube shape, and a lower end of the water pipe 35 is disposed below the lower end of the opening 1 formed on the side plate 5.

Therefore, when the water or culture solution is provided to the water tray part 30, the water or culture solution is provided to the water pipe 35 through the through hole 33 formed in the water tray bottom plate 32 and is then provided to the inside of the block body 10.

In the first embodiment of the present invention, in a state in which the plurality of water culture blocks 100 are stacked, the overflow tube 20 protruding from an outer surface of the bottom plate 9 of the water culture block 100 disposed at a relatively upper side is disposed at a location corresponding to the water tray part 32 of the water culture block 100 disposed at a relatively lower side.

Accordingly, when the water or culture solution is provided to the water culture block 100 disposed at a relatively upper side of the stacked water culture blocks 100, since the water or culture solution discharged from the overflow tube 20 of the water culture block 100 disposed at the upper side is provided to the water tray part 30 of the water culture block 100 disposed at a relatively lower side and is then provided to the inside of the block body 10 through the water pipe 35, it is possible to suppress or prevent the generation of noise when the water or culture solution falls into the block body.

On the other hand, in order to prevent separation of the water culture block 100 disposed at a relatively upper side and the water culture block 100 disposed at a relatively lower side in a state in which the plurality of water culture blocks 100 are stacked, a plurality of engagement protrusions 40 are formed on the outer surface of the bottom plate 9 of the block body 10.

In the first embodiment of the present invention, the plurality of engagement protrusions 40 may be formed integrally with the bottom plate 9 of the block body 10 or may be attached to the bottom plate 9 of the block body 10 by an adhesive or the like.

The engagement protrusions 40 may be formed, for example, in a column shape. In the first embodiment of the present invention, the engagement protrusions 40 may be formed in a cylindrical shape. Although the cylindrical engagement protrusions 40 are illustrated and described in the first embodiment of the present invention, the engagement protrusions 40 may be formed in various shapes such as a rectangular shape, a polygonal shape or the like.

The engagement protrusions 40 formed on the outer surface of the bottom plate 9 are formed, for example, at positions corresponding to the water tray part 30. For example, the engagement protrusions 40 may be formed at corners of the outer surface of the bottom plate 9 or may be intermittently formed along an edge of the outer surface of the bottom plate 9.

Meanwhile, when the water culture blocks 100 according to the first embodiment of the present invention are stacked, the water culture block 100 may not be disposed below a bottom of the water culture block 100 disposed at the upper side, in such a case, the water or culture solution falling from the overflow tube 20 of the water culture block 100 disposed at the upper side may fall onto the ground and contaminate the ground.

In order to prevent this, the overflow tube 20 of the water culture block 100 disposed at the upper side below which no water culture block is disposed may include an overflow tube plug 90 to block the overflow tube 20, as shown in FIG. 4, and the overflow tube plug 90 includes a rod-shaped closing portion 92 to be inserted into a hollow portion of the overflow tube 20, and a head 94 for inserting or separating the closing portion 92 into or from the hollow portion of the overflow tube 20.

Figure 5:
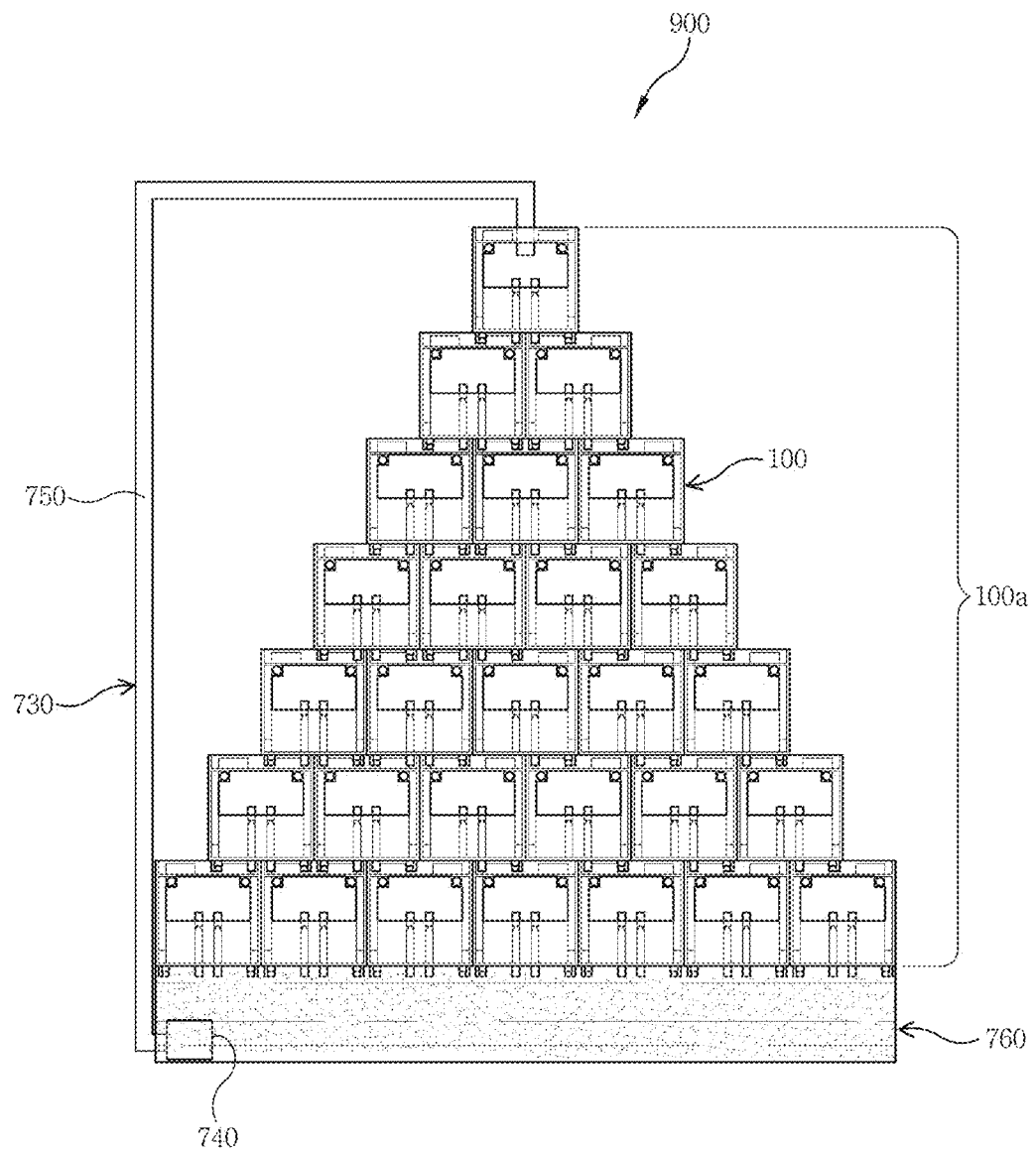
FIG. 5 is a side view illustrating a water culture device according to the first embodiment of the present invention.

FIG. 5 is a side view illustrating a water culture device according to the first embodiment of the present invention.

Referring to FIG. 5, a water culture device 900 includes a water culture unit 100a, a water reservoir 760, and a circulation unit 730.

The water culture unit 100a according to the first embodiment of the present invention includes a plurality of stacked water culture blocks 100. The water culture block 100 shown in FIG. 5 has a configuration which is substantially the same as that of the water culture block 100 shown in FIGS. 1 to 4. Therefore, overlapping descriptions for the same configurations will be omitted, and the same terms and the same reference numerals will be given to the same configurations.

The water culture unit 100a is formed by stacking the plurality of water culture blocks 100, the overflow tube 20 of the water culture block 100 disposed at an upper side of the stacked water culture blocks 100 is disposed at a location corresponding to the water tray part 30 of each of the water culture blocks 100 disposed at a lower side, and the water culture blocks 100 are coupled with each other by the protrusion 40 and the overflow tube 20 protruding downward from the bottom plate 9.

The water reservoir 760 is disposed at a lowermost end of the water culture unit 100a, and the water reservoir 760 serves to store a fluid such as water or a culture solution to be provided to the water culture block 100 of the water culture unit 100a.

The circulation unit 730 includes a pump 740 and a hose 750.

The pump 740 may be disposed inside the water reservoir 760 or outside the water reservoir 760, and the pump 740 pumps the water or culture solution in the water reservoir 760.

The water or culture solution pumped from the inside of the water reservoir 760 is provided to the uppermost water culture block 100 of the water culture blocks 100 constituting the water culture unit 100a through the hose 750 connected to the pump 740 and is then sequentially supplied from the uppermost water culture block 100 to the water culture blocks disposed at a lower side.

As described above in detail, the water culture block is advantageous in that water culturing is more easily and cleanly performed, the water blocks may be stacked in multiple stages, and, in particular, may be applied to an art wall used on a wall surface or to a wall of room, or may be embodied with a three-dimensional shape, and it is possible to individually provide a plant to each of the water culture blocks stacked in multiple stages.

Hereinafter, a water culture block according to a second embodiment of the present invention will be described.

Figure 6:
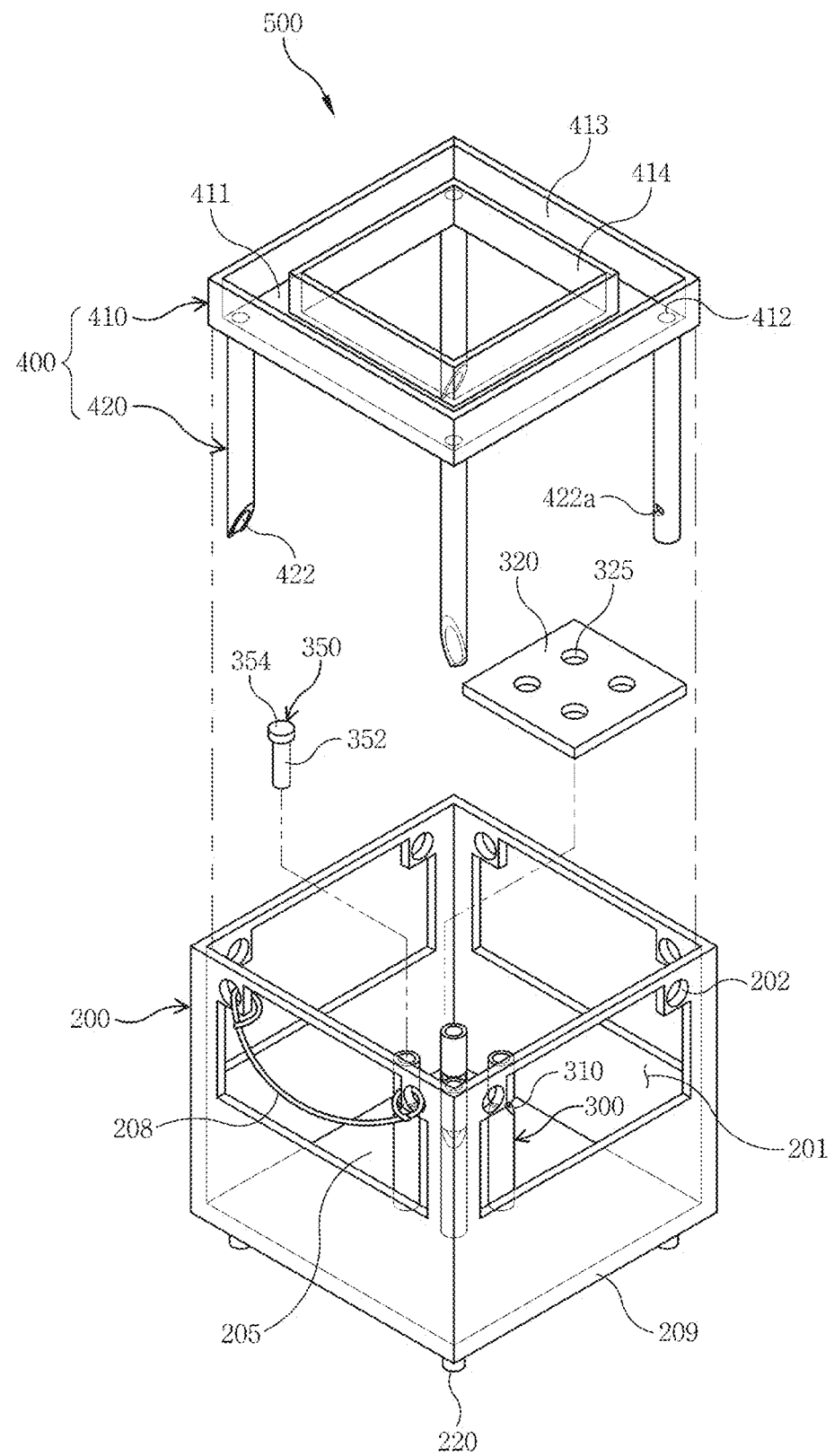
FIG. 6 is an exploded perspective view of a water culture block according to a second embodiment of the present invention.
Figure 7:
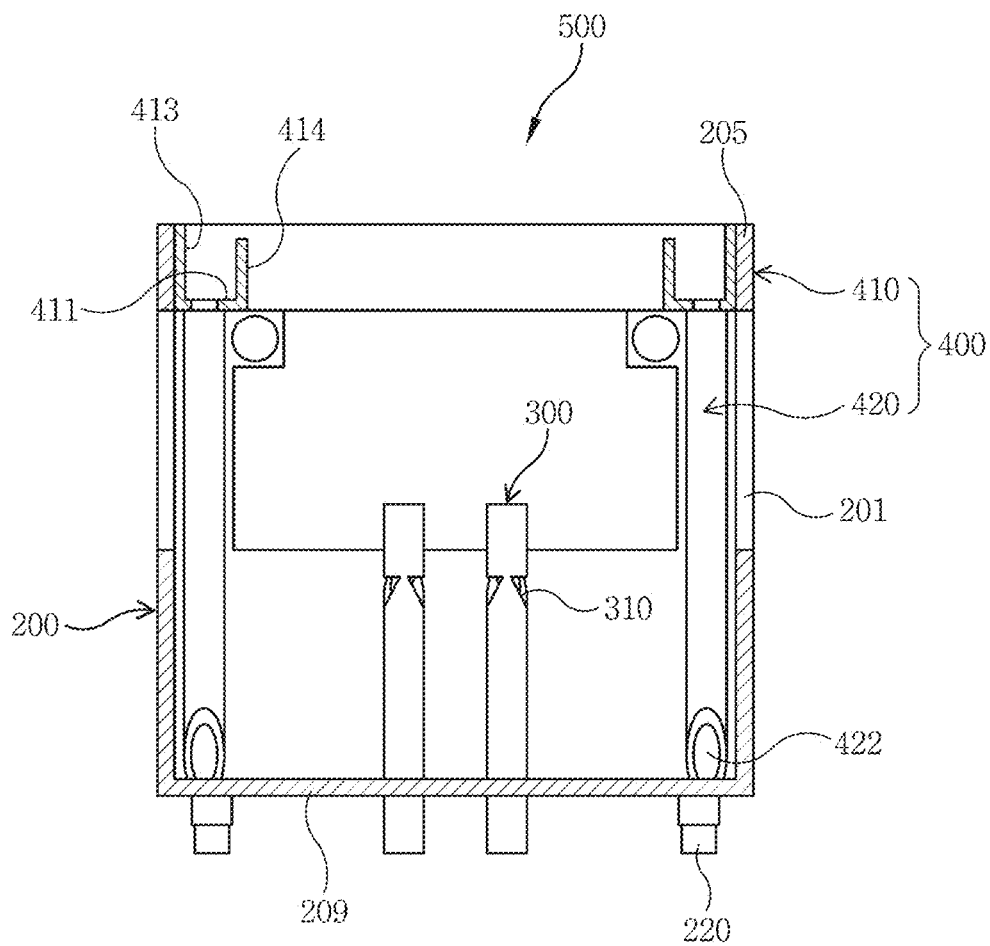
FIG. 7 is a longitudinal sectional view of FIG. 6.
Figure 8:
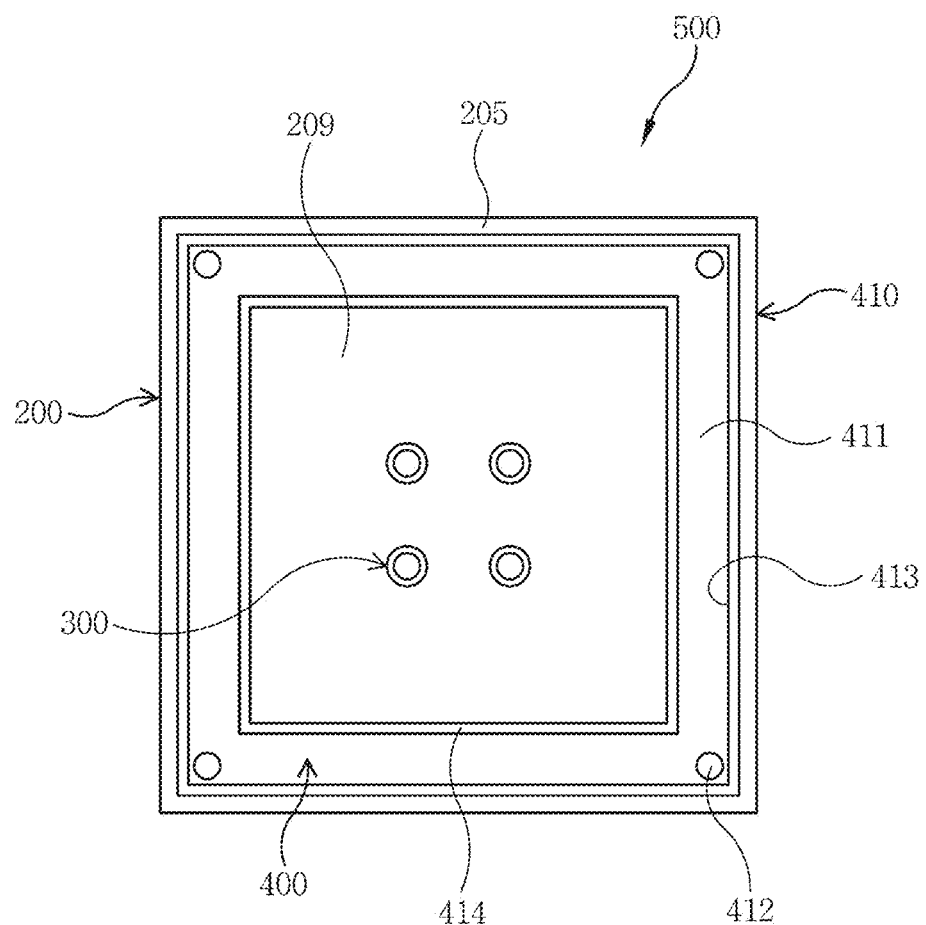
FIG. 8 is a plan view of the water culture block in FIG. 6.

FIG. 6 is an exploded perspective view of the water culture block according to the second embodiment of the present invention, FIG. 7 is a longitudinal sectional view of FIG. 6, and FIG. 8 is a plan view of the water culture block in FIG. 6.

Referring to FIGS. 6 to 8, a water culture block 500 includes a block body 200, an overflow tube 300, and a prefabricated water tray 400.

In the second embodiment of the present invention, the block body 200 and the prefabricated water tray 400 are configured to be assembled and disassembled with each other.

The block body 200 may be formed to have a three-dimensional shape having a receiving space formed therein and an open upper face.

For example, the block body 200 may be formed in a regular hexahedron shape having an open upper face or a rectangular parallelepiped shape having an open upper face. In addition to the above shape, the block body 200 may be formed to have an open pentagonal-shaped upper face, or may be formed in a truncated cone shape having an open upper face, a semispherical shape having an open upper face, a cylindrical shape having an open upper face, or the like.

An aquatic plant growing in water or a culture solution may be provided in the receiving space formed in the block body 200, and the block body 200 may be formed of a transparent material to allow a user to observe leaves, stems, and roots of the aquatic plant growing in the block body 200.

Alternatively, the block body 200 may be formed of a metal material which has no transparency but has high durability and is not easily corroded.

The block body 200 may be manufactured by assembling a plurality of pre-fabricated pieces, may be manufacture as a single body by an injection process, or may be manufactured by folding and welding a metal plate.

The block body 200 may be waterproofed to prevent leakage of water or culture solution received therein.

In the second embodiment of the present invention, the block body 200 may be formed in a hexahedral shape including a bottom plate 209 and a plurality of side plates 205 which each have an open upper portion.

For example, the block body 200 includes four side plates 205 and one bottom plate 209. The four side plates 205 and the one bottom plate 209 of the block body 200 may be assembled with each other or formed integrally with each other.

In the second embodiment of the present invention, openings 201 are formed in the side plates 205, an aquatic plant may be provided in the block body 200 or a part of the plant may be withdrawn to the outside of the block body 200 through the opening 201.

When the opening 201 is formed in each of the side plates 205, different plants may be individually provided in the block body 200 in different directions of the block body 200.

In the second embodiment of the present invention, the opening 201 may be formed in an intermediate portion between an upper and a lower end of the side plate 205, and a lower end of the opening 201 is formed at an appropriate location at which a sufficient amount of water or culture solution is filled in the block body 200.

On the other hand, through holes 202 are formed in both upper side portions of each of the side plates 205 adjacent to an upper end of the opening 201, and the through holes 202 formed in the side plates 205 facing each other among the side plates 205 are formed to face each other.

The through holes 202 adjacent to both sides of the opening 201 of the side plate 205 are provided to allow the block body 200 to be secured to a wall through nails or the like.

A connection string 208 may be coupled to the through holes 202 adjacent to both sides of the opening 201 formed in the side plate 205.

The connection string 208 connecting the through holes 202 to each other is disposed across the opening 201, and when the connection string 208 traverses the opening 201 and is coupled to the through holes 202 disposed at both sides of the opening 201, the connection string 208 prevents an aquatic plant inserted into the opening 201 from sagging or escaping from the opening 201. In addition, the connection string 208 may firmly connect the plurality of block bodies 200 to each other.

In the second embodiment of the present invention, by replacing the connection string 208 with an electric wire and installing a light bulb on the electric wire, it is possible to provide illuminating light to a part of or all of the block body 200 to improve aesthetics or to allow the block body 200 to be utilized as lighting.

The bottom plate 209 may be coupled to lower ends of the side plates 205 of the block body 200, and a receiving space may be formed in the block body 200 by the side plates 205 and the bottom plate 209.

In the second embodiment of the present invention, a plurality of engagement protrusions 220 may be formed on and protrude from an outer surface of the bottom plate 209 of the block body 200.

The plurality of engagement protrusions 220 may be intermittently formed along an edge of the outer surface of the bottom plate 209. Alternatively, the engagement protrusions 220 may be formed at edges of the outer surface of the bottom plate 209 and at a center of the bottom plate 209.

The engagement protrusions 220 serve to prevent separation of the lower water culture block 500 and the upper water culture block 500 when the water culture blocks 500 according to the second embodiment of the present invention are stacked.

In the second embodiment of the present invention, the block body 200 may be manufactured by an injection process using a synthetic resin material so that mass production of the block body 200 can be achieved.

The overflow tube 300 is formed to pass through the bottom plate 209 of the block body 200.

At least one or a plurality of overflow tubes 300 may be formed to pass through the bottom plate 209 of the block body 200.

In the second embodiment of the present invention, the overflow tube 300 may be coupled to the bottom plate 209 by an adhesive or the like or may be assemblably and detachably coupled to the bottom plate 209.

The overflow tube 300 passing through the bottom plate 209 has both ends thereof open and is formed in a hollow tube shape, and, for example, a rigid pipe or a flexible pipe may employed as the overflow tube 300.

The plurality of overflow tubes 300 may be arranged in the form of a matrix on the bottom plate 209. Specifically, the plurality of overflow tubes 300 may be arranged in the form of a matrix at a central portion of the bottom plate 209.

One end portion of the overflow tube 300 is disposed in the block body 200, and the other end portion opposite the one end portion of the overflow tube 300 is disposed outside the block body 200.

The overflow tube 300 prevents the water or culture solution from overflowing to the outside of the block body 200 through the opening 201 formed in the side plate 205 when the water or culture solution is provided in the block body 200.

The one end portion of the overflow tube 300 disposed in the block body 200 may be disposed at a location above the lower end of the opening 201 formed in the side plate 205, as shown in FIG. 2.

When the one end portion of the overflow tube 300 is disposed at a location higher than the lower end of the opening 201 formed in the side plate 205, as described above, the water or culture solution may overflow through the opening 201.

In order to prevent the above overflow, an oblique line-shaped or V-shaped cut-out portion 310 is formed on a lateral side of the overflow tube 300, and the cut-out portion 310 is formed at a location below the lower end of the opening 201 formed in the side plate 205 of the block body 200.

In the second embodiment of the present invention, when a water level of the water or culture solution provided in the block body 200 is adjusted through an opening formed at the one end portion of the overflow tube 300, the opening at the one end portion of the overflow tube 300 is frequently blocked by surface tension so that the water or culture solution may overflow through the opening 201 of the side plate 205, however, when the cut-out portion 310 is formed on the lateral side of the overflow tube 300, the water or culture solution may be discharged from the inside of the block body 200 to the outside through the overflow tube 300 regardless of clogging of the opening of the one end portion of the overflow tube 300.

In the second embodiment of the present invention, at least two cut-out portions 310 may be formed on the overflow tube 300. For example, the pair of the cut-out portions 310 may be formed on the overflow tube at the same height, or a plurality of cut-out portions 310 may be formed on the overflow tube 300 at different heights.

On the other hand, since a part of an aquatic plant is disposed in the block body 200 and a part of the aquatic plant is disposed outside the block body 200, the aquatic plant inserted through the opening 201 formed in the side plate 205 may frequently escape from the block body 200.

In order to prevent this, an escape-prevention plate 320 which presses a root of the aquatic plant to prevent the aquatic plant from escaping to the outside of the block body 200 is disposed in the block body 200.

In the second embodiment of the present invention, the escape-prevention plate 320 is coupled to the overflow tube 300 and presses the root of the aquatic plant to prevent the aquatic plant from escaping.

The escape-prevention plate 320 is formed, for example, in a plate shape, and through holes 325 into which the overflow tubes 300 are inserted are formed on the escape-prevention plate 320.

The through holes 325 are formed at a location corresponding to locations of the overflow tubes 300. In the second embodiment of the present invention, any one of the through holes 325 is formed to have a size such that the through hole is in contact with an outer circumferential surface of the overflow tube 300 when the overflow tube 300 is inserted into the escape-prevention plate 320, and the remaining through holes 325 are formed to have a size greater than that of the overflow tube 300.

By forming the through holes 325 of the escape-prevention plate 320 to have the above-described size, the overflow tubes 300 are more easily inserted into the through holes 325 formed on the escape-prevention plate 320 and the overflow tube 300 inserted into the escape-prevention plate 320 is not easily separated from the escape-prevention plate 320.

Meanwhile, when the water culture blocks 500 according to the second embodiment of the present invention are stacked, the water culture block 500 may not be disposed below a bottom of the water culture block 500 disposed at the upper side. In this case, the water or culture solution falling from the overflow tube 300 of the water culture block 500 disposed at the upper side may fall onto the ground.

In order to prevent this, when no water culture block is disposed at the lower side, the overflow tube 300 of the water culture block 500 disposed at the upper side may include an overflow tube plug 350 to block the overflow tube 300, as shown in FIG. 6, and the overflow tube plug 350 includes a rod-shaped closing portion 352 to be inserted into a hollow portion of the overflow tube 300, and a head 354 for inserting or separating the closing portion 352 into or from the hollow portion of overflow tube 300.

On the other hand, the prefabricated water tray 400 is inserted into the block body 200 or separated from the block body 200. That is, the prefabricated water tray 400 may be assembled to or disassembled from the block body 200.

Referring back to FIG. 6, the prefabricated water tray 400 includes a water tray body 410 and a pipe 420. In the second embodiment of the present invention, the prefabricated water tray 400 may be formed of a rigid synthetic resin material or a flexible synthetic resin material.

The water tray body 410 serves to store the water or culture solution falling into the block body 200 from a location above the block body 200, and the water tray body 410 includes a water tray bottom plate 411 and water tray side plates 413 and 414.

The water tray bottom plate 411 is formed, for example, in the shape of a rectangular band having an opening formed therein, and the water tray bottom plate 411 has through holes 412 formed at four corners thereof.

The water tray side plates 413 and 414 are disposed along an outer surface and an inner surface of the water tray bottom plate 411 in a direction perpendicular to the water tray bottom plate 411, respectively. A space for receiving the water or culture solution is formed in the water tray body by the water tray bottom plate 411 and the water tray side plates 413 and 414.

In the second embodiment of the present invention, the water tray bottom plate 411 and the water tray side plates 413 and 414 may be assembled with each other or may be formed integrally with each other.

The pipe 420 is disposed on a lower surface of the water tray bottom plate 411 of the water tray body 410, and the pipe 420 has a pipe shape having a hollow portion which is in communication with the through hole 412.

In the second embodiment of the present invention, the pipe 420 prevents noise from being generated by falling water when water received in the water tray body 410 is provided to the inside of the block body 200, and prevents the water fallen into the block body 200 from splashing outside the block body 200 and contaminating the outside of the block body 200.

In the second embodiment of the present invention, one end of the pipe 420 is coupled to the lower surface of the water tray bottom plate 411, and the other end opposite the one end of the pipe 420 is in contact with an upper surface of the bottom plate 209 of the block body 200.

The pipe 420 serves to provide the water or culture solution provided inside the water tray body 410 to the inside of the block body 200 and to stably support the water tray body 410 in the block body 200.

The one end of the pipe 420 in contact with the lower surface of the water tray bottom plate 411 is formed in a flat shape to increase a contact area with respect to the water tray bottom plate 411, a cut-out portion 422 cut out in a diagonal direction is formed on a portion of the pipe 420 in contact with the bottom plate 209 of the block body 200. The cut-out portion 422 allows the water or culture provided to the pipe 420 to be smoothly provided to the inside of the block body 200.

Although one embodiment of the present invention shows and describes the cut-out portion 422 formed by a portion of the pipe 420 facing the bottom plate 209 being cut-out in the diagonal direction, unlike the above configuration, the portion of the pipe 420 facing the bottom plate 209 may be formed in parallel with the bottom plate 209 and a through hole 422a may be formed in a part of the pipe 420, as shown in FIG. 6.

In the water tray side plates 413 and the 414 of the water tray body 410, the water tray side plate 413 in contact with an inner side surface of the side plate 205 of the block body 200 may have a height smaller than that of the side plate 414 disposed at an inner side thereof or may not be formed on the water tray body 410, this is because the side plate 205 of the block body 200 may serve as the water tray side plate 413. Meanwhile, when the water tray side plate 413 is not formed, the water tray bottom plate 411 is formed to allow an outer side surface thereof to be in contact with the inner side surface of the side plate 205 of the block body 200, and this is to prevent the water or culture solution received in the water tray body 410 from being leaked to the inside of the block body 200.

Figure 9:
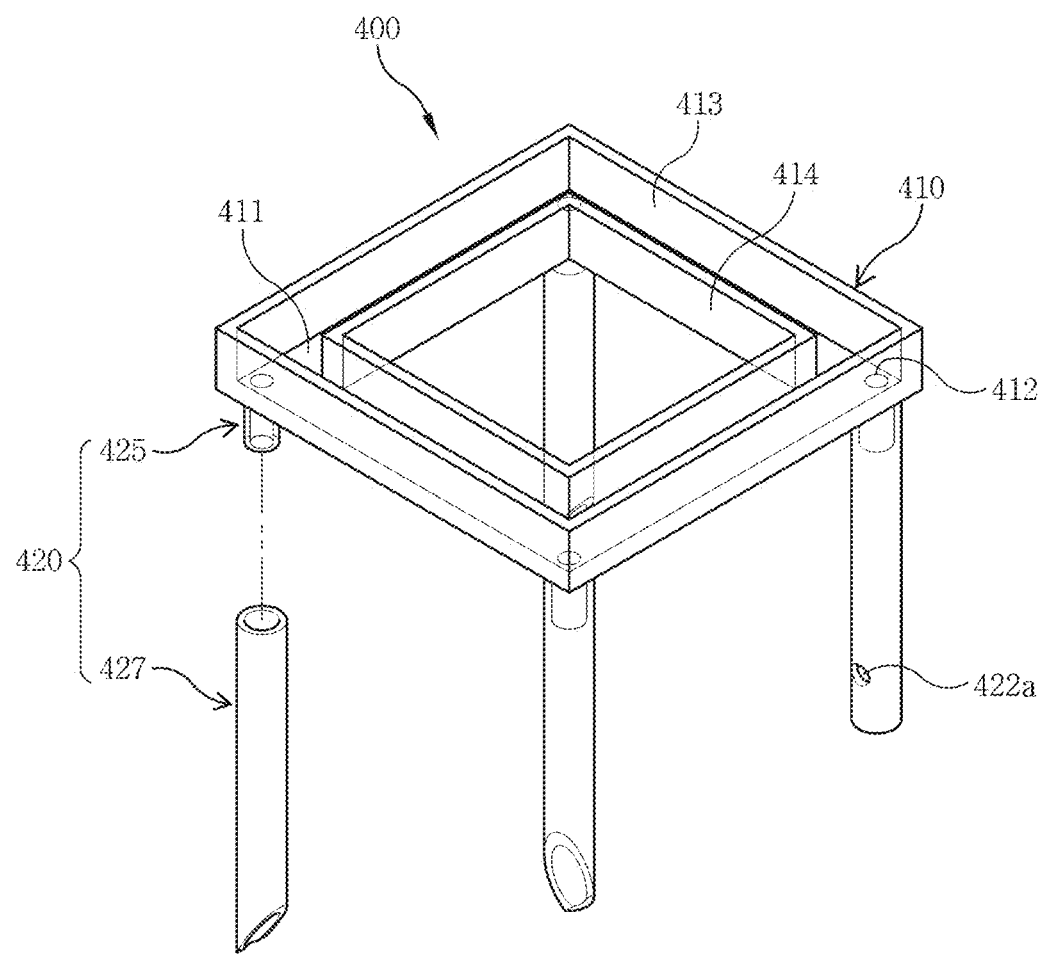
FIG. 9 is a perspective view illustrating another embodiment of a prefabricated water tray in FIG. 6.
Figure 10:
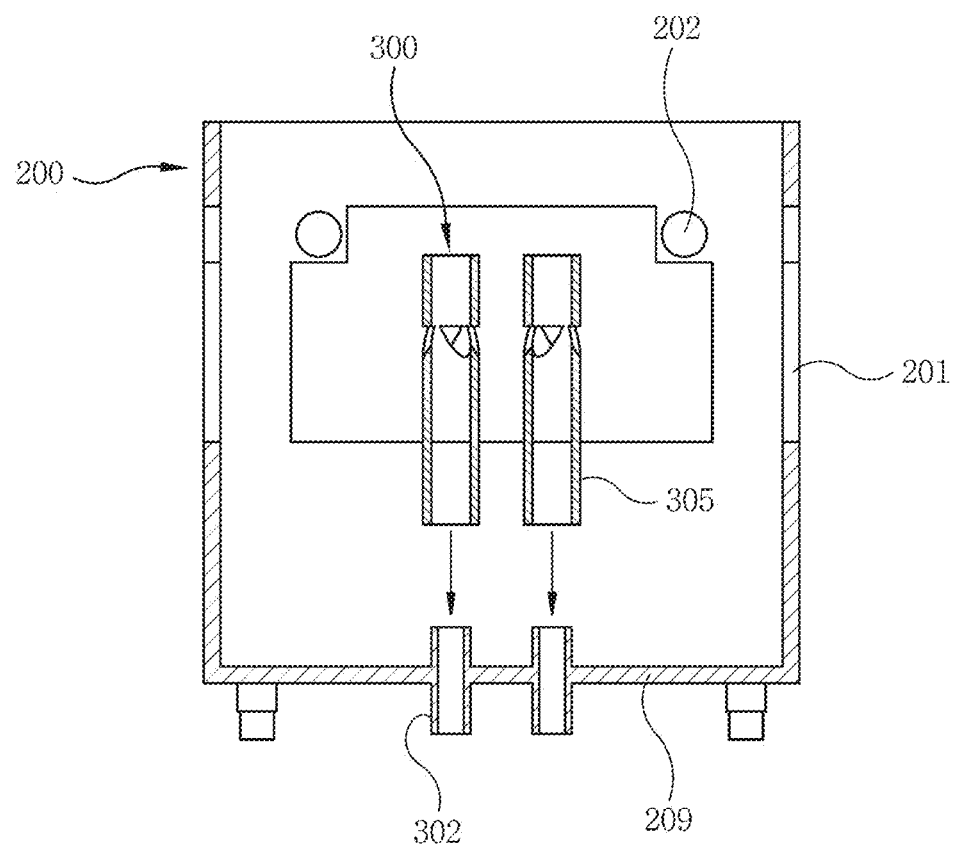
FIG. 10 is an exploded sectional view illustrating another embodiment of an overflow tube in FIG. 6.

FIG. 9 is a perspective view illustrating another embodiment of the prefabricated water tray in FIG. 6, and FIG. 10 is an exploded sectional view illustrating another embodiment of the overflow tube in FIG. 6. Except a coupling structure of a pipeline of the prefabricated water tray and the overflow tube, the water culture block in the second embodiment is substantially the same as that shown in FIGS. 6 to 8. Therefore, overlapping descriptions for the same configurations will be omitted, and the same terms and the same reference numerals will be given to the same configurations.

Referring to FIG. 9, the prefabricated water tray 400 includes the water tray body 410 and the pipe 420. In another embodiment of the present invention, the prefabricated water tray 400 may be formed of a rigid synthetic resin material or a flexible synthetic resin material.

The pipe 420 includes a first pipe 425 and a second pipe 427.

The first pipe 425 is formed in a pipe shape to be coupled with the through hole 412 formed in the water tray body 410.

The second pipe 427 is formed in a pipe shape having a diameter to be fitted to an outer circumferential surface of the first pipe 425, and an end portion of the second pipe 427 is in contact with the bottom plate 209 of the block body 200.

In another embodiment of the present invention, by forming the first pipe 425 connected to the water tray body 410 and the second pipe 427 coupled to the first pipe 425 as the pipe 420, it is possible to greatly shorten a time required for coupling the pipe 420 to the water tray body 410 and to selectively separate and assemble only a damaged part when a part of the water tray body 410 or the pipe 420 is damaged.

Referring to FIG. 10, the overflow tube 300 coupled to the block body 200 includes a first overflow unit 302 and a second overflow unit 305. In another embodiment of the present invention, the first overflow unit 302 and the second overflow unit 305 may be formed of a rigid synthetic resin material or a flexible synthetic resin material.

The first overflow unit 302 is formed to pass through the bottom plate 209 of the block body 200, and the first overflow unit 302 is formed in a pipe shape. A part of the first overflow unit 302 protrudes from a lower surface of the bottom plate 209, and a part of the first overflow unit 302 protrudes from the upper surface of the bottom plate 209.

The second overflow unit 305 is disposed at an inner side of the block body 200, and the second overflow unit 305 is formed in a pipe shape which is coupled to the first overflow unit 302 protruding from the upper surface of the bottom plate 209.

In another embodiment of the present invention, the first overflow unit 302 and the second overflow unit 305 may be coupled to each other in an interference fitting manner, but the first and second overflow units 302 and 305 may also be coupled to each other in a screw-coupling manner.

In another embodiment of the present invention, by forming the first and second overflow units 302 and 305 to be mutually disassemblable and assemblable, even when any one of the first and second overflow units 302 and 305 is broken, it is possible to exchange only the broken part.

Figure 11:
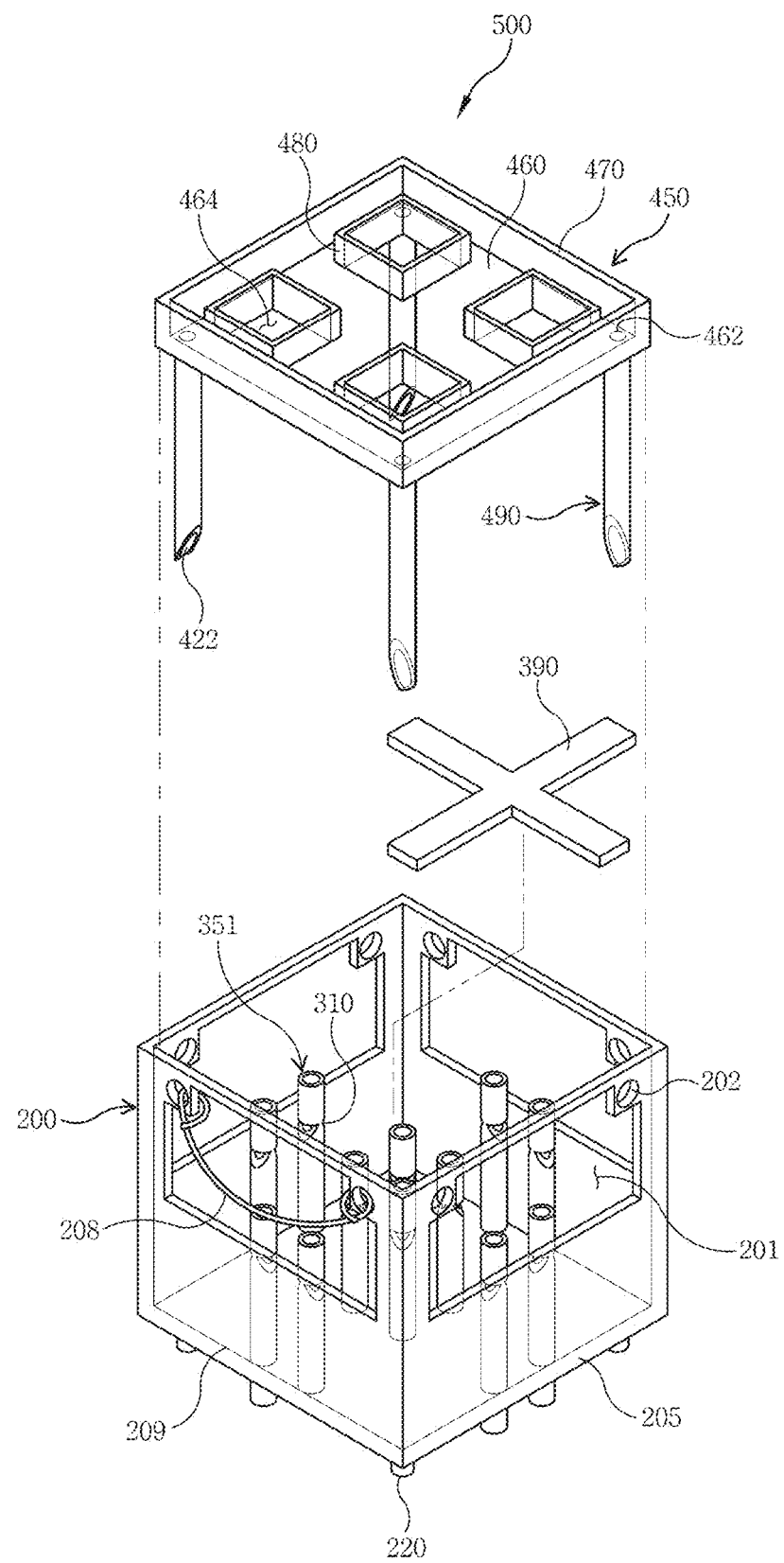
FIG. 11 is an exploded perspective view illustrating a water culture block according to a third embodiment of the present invention.
Figure 12:
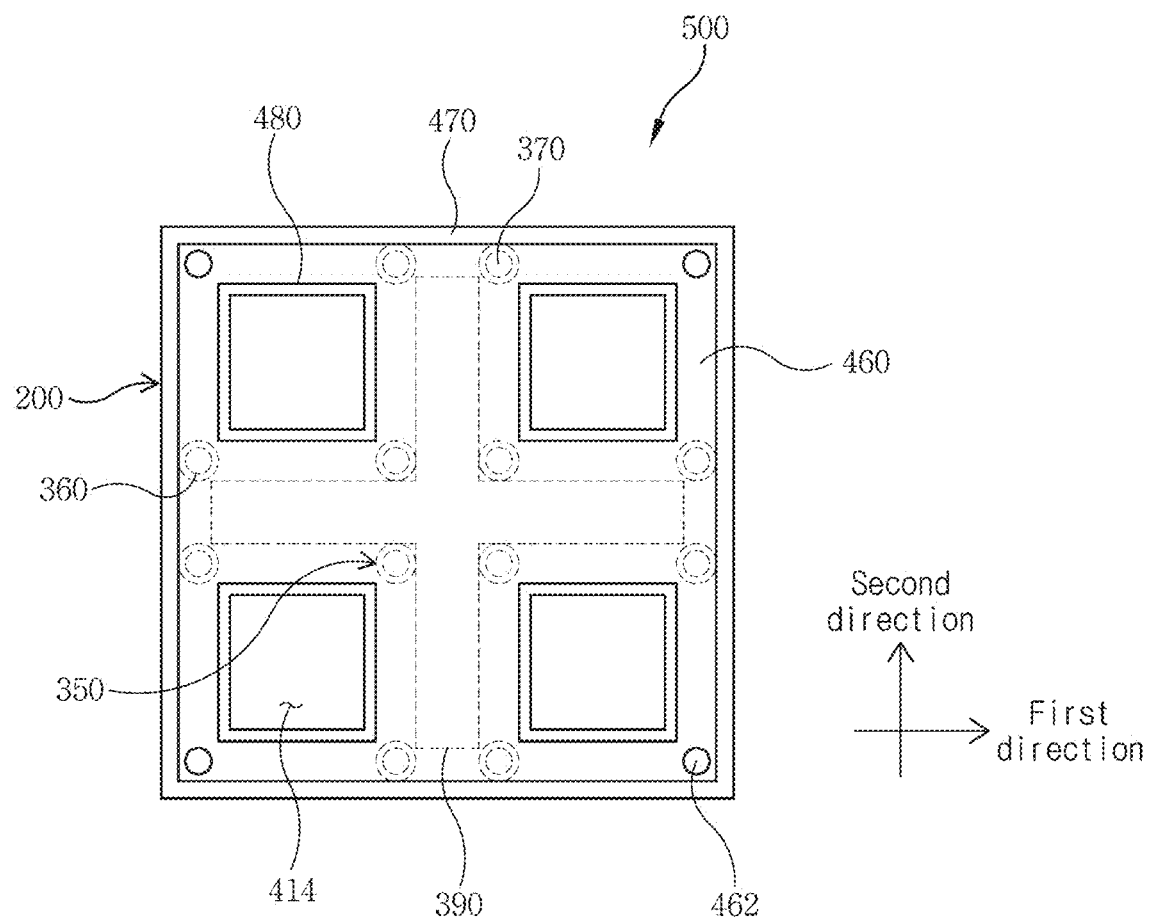
FIG. 12 is a plan view of FIG. 11.

On the other hand, FIG. 11 is an exploded perspective view illustrating a water culture block a third embodiment of the present invention, and FIG. 12 is a plan view of FIG. 11. A block body of the water culture block shown in FIGS. 12 and 13 has a configuration which is substantially the same as that of the water culture block shown in FIGS. 6 to 8 and described in the above description. Therefore, overlapping descriptions for the same configurations will be omitted, and the same terms and the same reference numerals will be given to the same configurations.

Referring to FIGS. 11 and 12, the water culture block 500 includes the block body 200, an overflow tube 351, and a prefabricated water tray 450.

The overflow tube 351 is coupled to the bottom plate 209 connected to the side plate 205 of the block body 200.

In the third embodiment of the present invention, at least one or a plurality of overflow tubes 351 may be formed to pass through the bottom plate 209 of the block body 200.

The overflow tube 351 may include first overflow tubes 360 formed in two rows along a first direction of the bottom plate 209, and second overflow tubes 370 formed in two rows along a second direction perpendicular to the first direction.

The first overflow tubes 360 pass through the central portion of the bottom plate 209 along the first direction, and the second overflow tubes 370 pass through the central portion of the bottom plate 209 along the second direction.

The first and second overflow tubes 360 and 370 intersect at the central portion of the bottom plate 209, and the first and second overflow tubes 360 and 370 are arranged in a cross shape when viewed in a plan view.

Referring to FIG. 12, an escape-prevention plate 390 shown by a dotted line is formed in a plate shape, the escape-prevention plate 390 may be disposed in association with the overflow tubes 351.

The escape-prevention plate 390 is formed to have a size and shape suitable to be inserted into a space between the first overflow tubes 360 disposed in the two rows and the second overflow tubes 370 disposed in the two rows, as shown in FIG. 12.

For example, the escape-prevention plate 390 may be a plate having a cross shape suitable for insertion between the first overflow tubes 360 and the second overflow tubes 370.

Although the escape-prevention plate 390 has been shown and described as being a cross-shaped plate suitable for insertion between the first and second overflow tubes 360 and 370 in the third embodiment of the present invention, the escape-prevention plate 390 may be manufactured in various shapes.

The prefabricated water tray 450 includes a water tray bottom plate 460, water tray side plates 470 and 480, and a pipe 490. In the third embodiment of the present invention, the prefabricated water tray 450 may be formed of a rigid synthetic resin material or a flexible synthetic resin material.

The water tray bottom plate 460 is formed, for example, in a plate shape, the water tray bottom plate 460 is disposed to face the bottom plate 209 of the block body 200, and the water tray bottom plate 460 has a shape and a size for insertion into the block body 200 in a precisely fitting manner.

Through holes 462 to be connected to the pipes 490 are formed on four corners of the water tray bottom plate 460, and a plurality of openings 464 are formed on a central portion of the water tray bottom plate 460.

In the third embodiment of the present invention, the plurality of openings 464 may be arranged in a matrix form, and the water tray bottom plate 460 is formed to cover the overflow tube 351.

The water tray side plates 470 and 480 are coupled to an upper surface of the water tray bottom plate 460 to form a receiving space on the water tray bottom plate 460.

The water tray side plate 470 disposed at an outer side is formed along an outer surface of the water tray bottom plate 460 and the other water tray side plate 480 is formed along a periphery of the opening 464 formed at the central portion of the water tray bottom plate 460 to form the receiving space on the water tray bottom plate 460.

The pipe 490 is disposed on a lower surface of the water tray bottom plate 460 of the prefabricated water tray 450, and the pipe 490 has a pipe shape having a hollow portion which is in communication with the through hole 462.

In the third embodiment of the present invention, one end of the pipe 490 is coupled to the lower surface of the water tray bottom plate 460, and the other end opposite the one end of the pipe 490 is in contact with the upper surface of the bottom plate 209 of the block body 200.

The pipe 490 serves to provide water or a culture solution, which is provided to the prefabricated water tray 450, to the inside of the block body 200 and to stably support the prefabricated water tray 450 in the block body 200.

In the third embodiment of the present invention, the pipe 490 is divided into at least two pipes, any one of the separated pipes is connected to the water tray bottom plate 460, and the other one may be coupled to the pipe connected to the water tray bottom plate 460.

Figure 13:
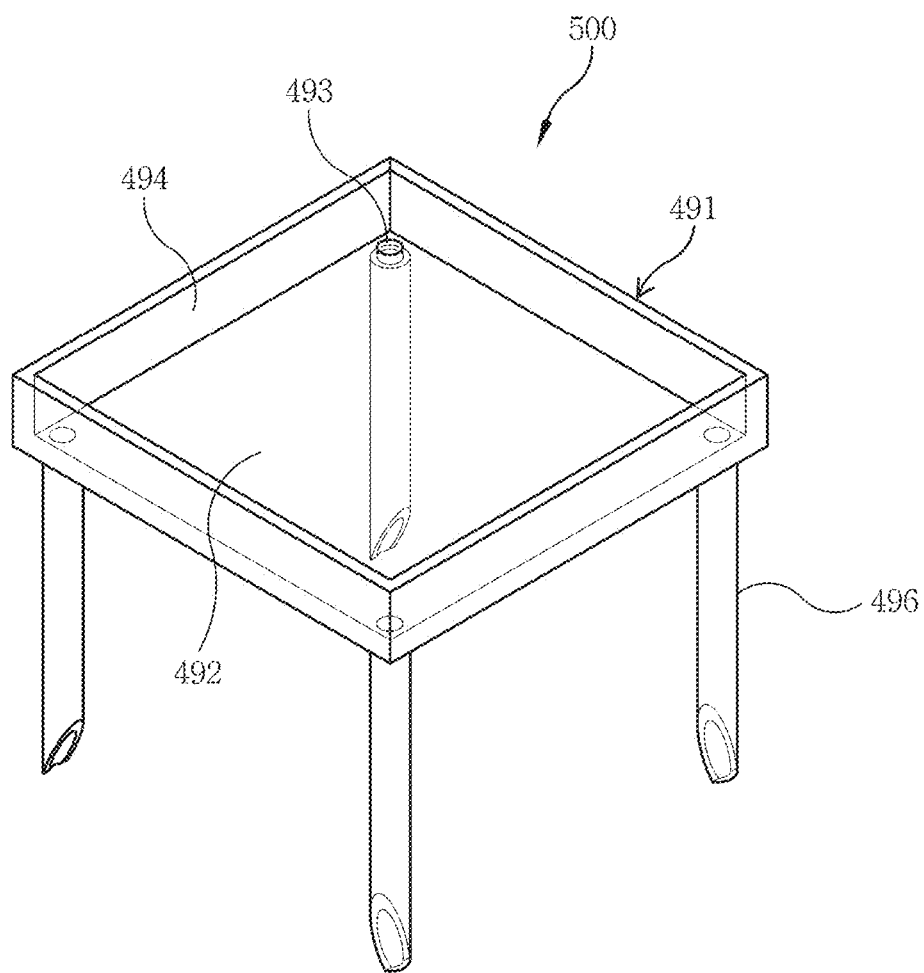
FIG. 13 is an exploded perspective view illustrating a water culture block according to a fourth embodiment of the present invention.
Figure 14:
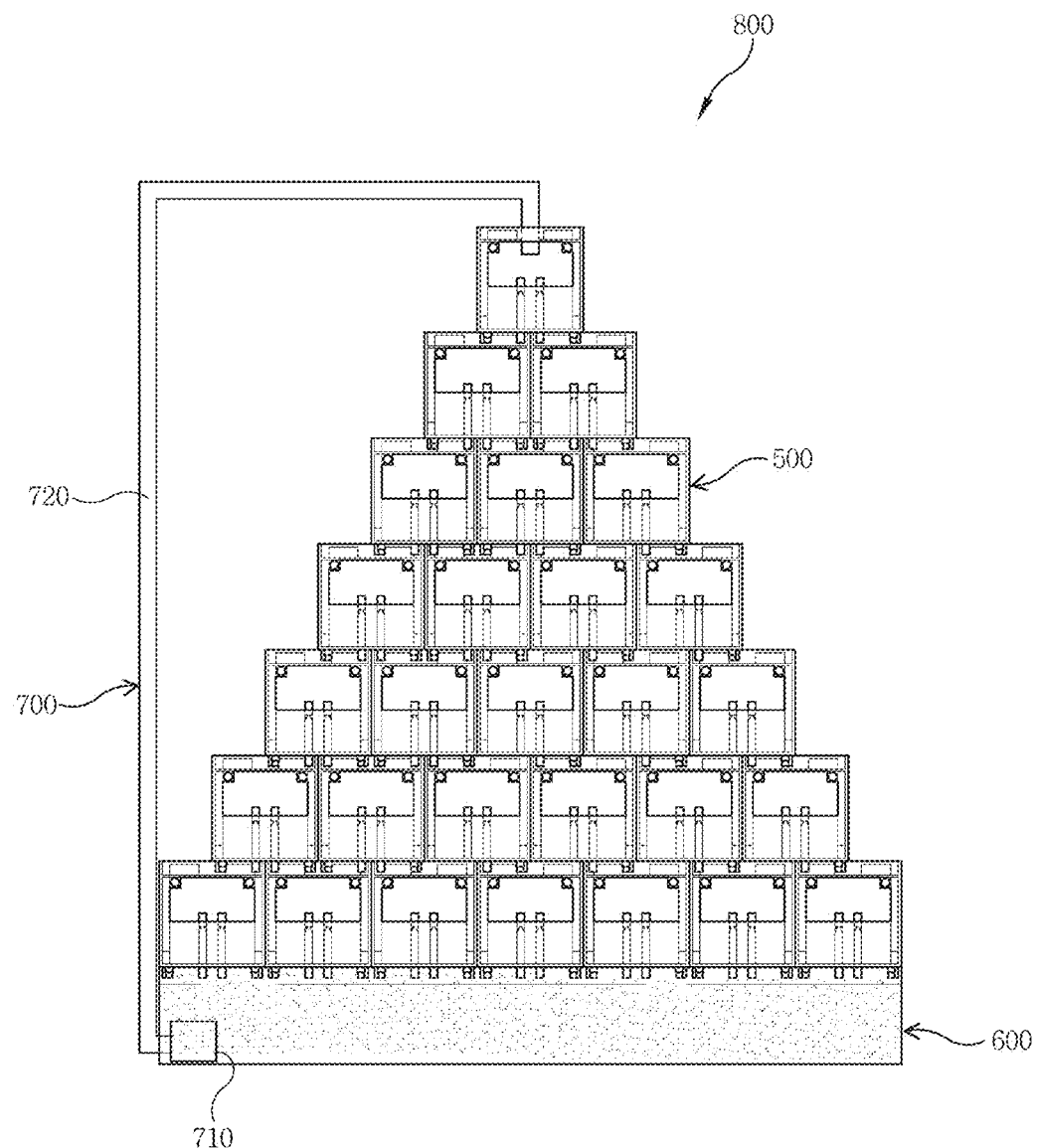
FIG. 14 is a side view illustrating a water culture device according to the second embodiment of the present invention.

FIG. 13 is an exploded perspective view illustrating a water culture block according to a fourth embodiment of the present invention. Except the prefabricated water tray shown in FIG. 13, the water culture block shown in FIG. 13 is substantially the same as that shown in FIGS. 6 to 8. Therefore, overlapping descriptions for the same configurations will be omitted, and the same terms and the same reference numerals will be given to the same configurations.

Referring to FIGS. 6 and 13, the water culture block 500 includes the block body 200 (see FIG. 6), the overflow tube 300 (see FIG. 6), and the prefabricated water tray 491.

The prefabricated water tray 491 includes a water tray bottom plate 492 having through hole 493, a water tray side plate 494, and a pipe 496. In the fourth embodiment of the present invention, the prefabricated water tray 491 may be formed of a rigid synthetic resin material or a flexible synthetic resin material.

The water tray bottom plate 492 has a plate shape in which only a through hole 293 is formed, and the water tray side plate 494 is formed perpendicular to the water tray bottom plate 492 along an edge of the water tray bottom plate 492.

The pipe 496 is disposed at a location on a lower surface of the water tray bottom plate 492 corresponding to a through hole 493, and the pipe 496 is firmly coupled to the lower surface of the water tray bottom plate 492.

In the fourth embodiment of the present invention, the pipe 496 is divided into at least two pipes, any one of the pipes 496 is coupled to the water tray bottom plate 492 and the other pipe may be coupled to the pipe 496 coupled to the water tray bottom plate 492 in a fitting manner or the like.

Figure 15:
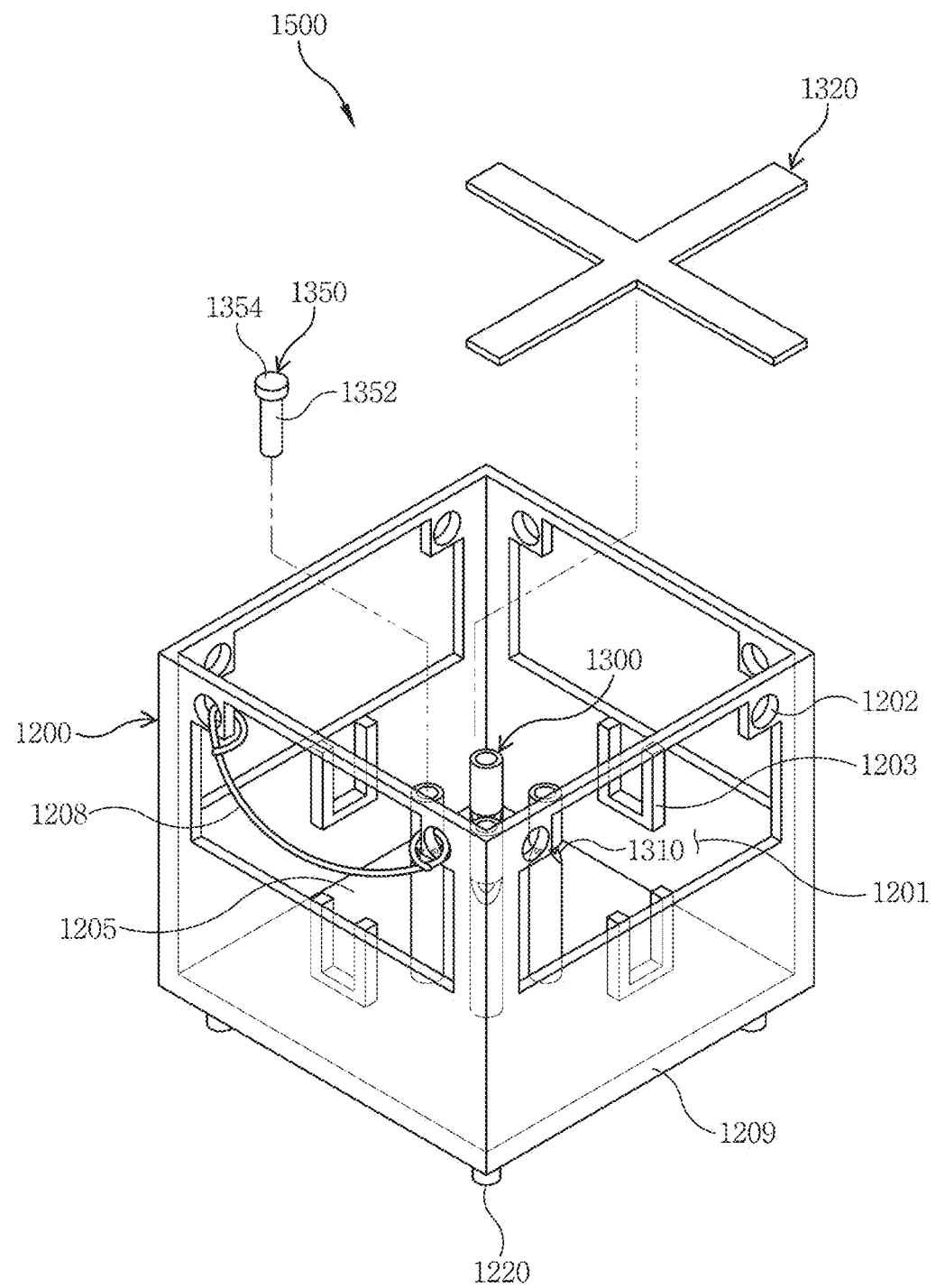
FIG. 15 is an exploded perspective view illustrating a water culture block according to a fifth embodiment of the present invention.
Figure 16:
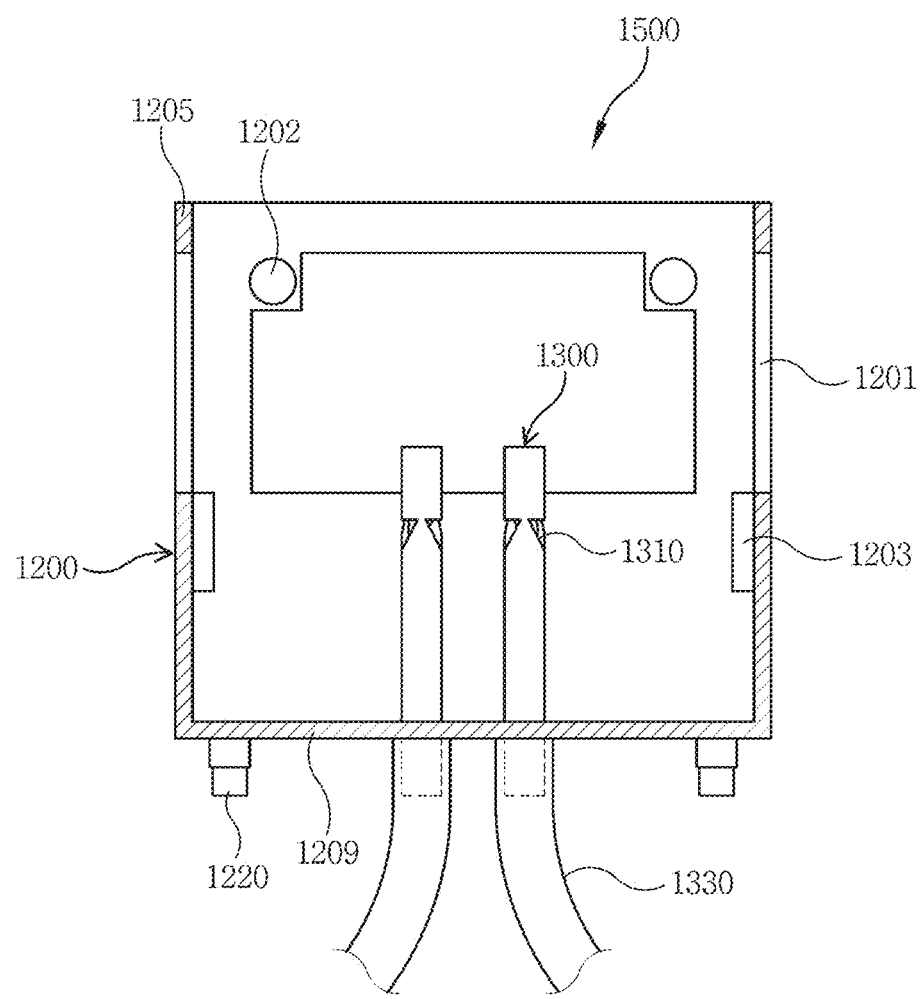
FIG. 16 is a longitudinal sectional view of the water culture block according to the fifth embodiment of the present invention.
Figure 17:
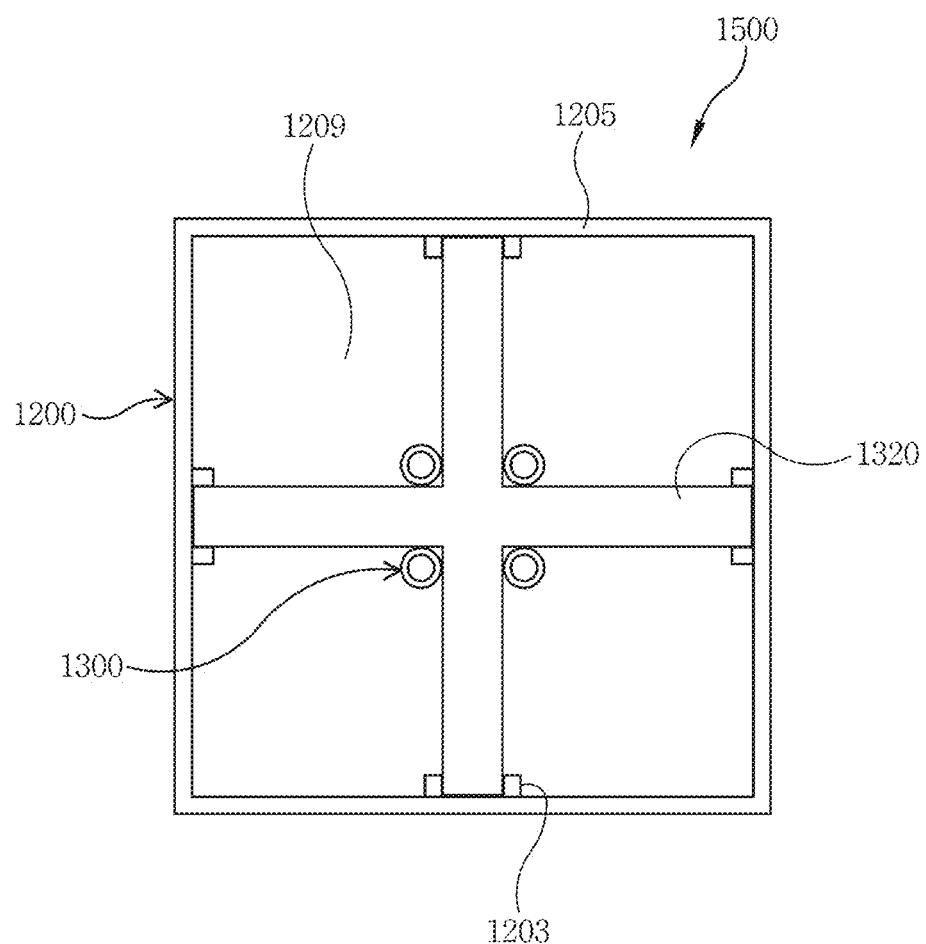
FIG. 17 is a view showing a lower surface of the water culture block according to the fifth embodiment of the present invention.

FIG. 15 is an exploded perspective view illustrating a water culture block according to a fifth embodiment of the present invention, FIG. 16 is a longitudinal sectional view of the water culture block according to the fifth embodiment of the present invention, and FIG. 17 is a view showing a lower surface of the water culture block according to the fifth embodiment of the present invention.

Referring to FIGS. 15 to 17, a water culture block 1500 according to the fifth embodiment of the present invention includes a block body 1200, an escape-prevention plate 1320, and an overflow tube 1300.

The block body 1200 may be formed to have a three-dimensional shape having a receiving space formed therein and an open upper face.

For example, the block body 1200 may be formed in a regular hexahedron shape having an open upper face or a rectangular parallelepiped shape having an open upper face. In addition to the above shape, the block body 1200 may be formed to have an open and pentagon-shaped upper face, or may be formed in a truncated cone shape having an open upper face, a semispherical shape having an open upper face, a cylindrical shape having an open upper face, or the like.

An aquatic plants growing in water or a culture solution may be provided in the receiving space formed in the block body 1200, and the block body 1200 may be formed of a transparent material to allow a user to observe leaves, stems, and roots of the aquatic plant growing in the block body 1200.

Alternatively, the block body 1200 may be formed of various materials, such as a metal material which has no transparency but has high durability and is not easily corroded.

The block body 1200 may be manufactured by assembling a plurality of pre-fabricated pieces, may be manufactured as a single body by an injection process, or may be manufactured by folding and welding a metal plate.

The block body 1200 may be waterproofed to prevent leakage of water or a culture solution received therein.

The above-described block body 1200 may be manufactured in a hexahedral shape including a bottom plate 1209 and a plurality of side plates 1205 which each have an open upper portion.

For example, the block body 1200 includes four side plates 1205 and one bottom plate 1209. The four side plates 1205 and the one bottom plate 1209 of the block body 1200 may be assembled with each other or may be formed integrally with each other.

Openings 1201 are formed in each of the side plates 1205, and an aquatic plant may be provided in the block body 1200 or a part of the plant may be withdrawn outside the block body 1200 through the openings 1201.

When the opening 1201 is formed in each of the side plates 1205, different plants may be individually provided in the block body 1200 in different directions of the block body 1200.

The opening 1201 may be formed in an intermediate portion between an upper and a lower end of the side plate 1205, and a lower end of the opening 1201 is formed at an appropriate location at which a sufficient amount of water or culture solution is filled in the block body 1200.

On the other hand, through holes 1202 are formed in both upper side portions of each of the side plates 1205 adjacent to an upper end of the opening 1201, and the through holes 202 formed in the side plates 1205 facing each other among the side plates 1205 are formed to face each other.

In addition, the through holes 202 adjacent to both sides of the opening 201 of the side plate 205 are provided to allow the block body 1200 to be secured to a wall through nails or the like.

A connection string 1208 may be coupled to the through holes 1202 adjacent to both sides of the opening 1201 formed on the side plate 205.

The connection string 1208 connecting the through holes 1202 to each other is disposed across the opening 201, and when the connection string 1208 traverses the opening 1201 and is coupled to the through holes 1202 disposed at both sides of the opening 1201, the connection string 1208 prevents an aquatic plant inserted into the opening 1201 from sagging or escaping from the opening 1201. In addition, the connection string 1208 may firmly connect a plurality of block bodies 1200 to each other.

In addition, a catching jaw 1203 may be formed on an inner surface of the side plate 1205. The escape-prevention plate 1320, which will be described later, may be seated on an upper surface of the catching jaw 1203.

The catching jaw 1203 may be formed on the inner surface of the side plate 1205 in a state in which the catching jaw 1203 is spaced downward from the opening 1201 by a predetermined distance. Accordingly, the escape-prevention plate 1320 seated on the upper surface of the catching jaw 1203 can be fixed in the side plate 1205 without moving out of the side plate 1205.

The catching jaw 1203 may be formed on each of the side plates 1205 so that escape-prevention plates 1320 may be seated at different locations depending on a shape of the escape-prevention plate 1320.

In this embodiment, although the catching jaw 1203 is formed in a concave-convex shape having a groove for placing the escape-prevention plate 1320 at a central portion thereof, the shape is not limited thereto and the catching jaw may be formed in various shapes such as a rectangular parallelepiped, a sphere, a cylinder, a triangular prism, and the like.

By replacing the connection string 1208 with an electric wire and installing a light bulb on the electric wire, it is possible to provide illuminating light to a part of or all of the block body 1200 to improve aesthetics thereof or to allow the block body 1200 to be utilized as lighting.

The bottom plate 1209 may be coupled to lower ends of the side plates 1205 of the block body 1200, and a receiving space may be formed in the block body 1200 by the side plates 1205 and the bottom plate 1209.

In the fifth embodiment of the present invention, a plurality of engagement protrusions 1220 may be formed on and protrude from an outer surface of the bottom plate 1209 of the block body 1200.

The plurality of engagement protrusions 1220 may be intermittently formed along an edge of the outer surface of the bottom plate 1209. Alternatively, the engagement protrusions 1220 may be formed at edges of the outer surface of the bottom plate 209 and at a center of the bottom plate 1209.

The engagement protrusions 1220 serve to prevent separation of a water culture block placed at a lower side and a water culture block placed at an upper side when water culture blocks 1500 according to the fifth embodiment of the present invention are stacked to form a water culture device, which will be described later.

In the fifth embodiment of the present invention, the block body 1200 may be manufactured by an injection process using a synthetic resin material so that mass production of the block body 1200 can be achieved.

The overflow tube 1300 is formed to pass through the bottom plate 1209 of the block body 1200.

At least one or a plurality of overflow tubes 1300 may be formed to pass through the bottom plate 1209 of the block body 1200.

In the fifth embodiment of the present invention, the overflow tube 1300 may be coupled to the bottom plate 1209 by an adhesive or the like, or may be assemblably and detachably coupled to the bottom plate 1209. However, the present invention is not limited thereto, and the overflow tube 1300 may be formed integrally with the block body 1200 by an injection process or the like.

The overflow tube 1300 passing through the bottom plate 1209 has both ends thereof open and is formed in a hollow tube shape, and, for example, a rigid pipe or a flexible pipe may be employed as the overflow tube 1300.

The plurality of overflow tubes 1300 may be arranged in the form of a matrix on the bottom plate 1209. Specifically, the plurality of overflow tubes 1300 may be arranged in the form of a matrix at a central portion of the bottom plate 1209.

One end portion of the overflow tube 1300 is disposed in the block body 1200, and the other end portion opposite the one end portion of the overflow tube 1300 is disposed outside the block body 1200.

In this embodiment, the overflow tubes 1300 may be arranged in the form of a rectangle at the central portion of the bottom plate 1209. Accordingly, the disposed overflow tubes 1300 act as the engagement protrusion 1220 so that, when the water culture blocks 1500 are installed in a plane on a wall surface or are stacked in a three-dimensional structure, the overflow tubes 1300 may serve to prevent separation of a water culture block located at a lower side and a water culture block located at an upper side. That is, a corner of the block body 1200 of the water culture block located at the lower side is placed between and engaged with the overflow tubes 1300 of water culture blocks located at the upper side so that the water culture block located at the lower side may be fixed.

The overflow tube 1300 prevents water or a culture solution from overflowing to the outside of the block body 1200 through the opening 1201 formed in the side plate 1205 when the water or culture solution is provided in the block body 1200.

Although the overflow tube 1300 is formed to be higher in height than the lower end of the opening 1201 formed in the side plate 1205 in the present embodiment, the present invention is not limited thereto, and the overflow tube may be formed to be lower or equal in height than the lower end of the opening 1201.

The one end portion of the overflow tube 1300 disposed in the block body 1200 may be disposed at a location above the lower end of the opening 1201 formed in the side plate 1205, as shown in FIG. 16.

When the one end portion of the overflow tube 1300 is disposed at the location higher than the lower end of the opening 1201 formed in the side plate 1205 as described above, the water or culture solution may overflow through the opening 1201.

In order to prevent the above overflow, an oblique line-shaped or V-shaped cut-out portion 1310 is formed on a lateral side of the overflow tube 1300, and the cut-out portion 1310 is formed at a location below the lower end of the opening 1201 formed in the side plate 1205 of the block body 1200.

In the fifth embodiment of the present invention, when a water level of the water or culture solution provided in the block body 1200 is adjusted through an opening formed at the one end portion of the overflow tube 1300, the opening at the one end portion of the overflow tube 1300 is frequently blocked by surface tension so that the water or culture solution may overflow through the opening 1201 of the side plate 1205, however, when the cut-out portion 1310 is formed on the lateral side of the overflow tube 1300, the water or culture may be discharged from the inside of the block body 1200 to the outside through the overflow tube 1300 regardless of clogging of the opening of the one end portion of the overflow tube 1300. The cut-out portion 1310 of the overflow tube 1300 makes it possible for the culture solution to uniformly disperse and flow into other water culture blocks 1500 disposed at a lower side through the overflow tube 1300.

In the fifth embodiment of the present invention, at least sixteen cut-out portions 1310 may be formed on the overflow tube 1300. For example, a pair of cut-out portions 1310 may be formed on the overflow tube at the same height, or a plurality of cut-out portions 1310 may be formed on the overflow tube 1300 at different heights.

Meanwhile, the escape-prevention plate 1320 is seated on an upper surface of the catching jaw 1203 formed on the side plate 1205 and presses roots of an aquatic plant to prevent the aquatic plant from escaping.

The escape-prevention plate 1320 is formed in a plate shape, may be disposed in association with the overflow tube 1300, and is formed to have a size and shape suitable for insertion into a space between the overflow tubes 1300.

For example, the escape-prevention plate 1320 may be a plate having a cross shape suitable for insertion between the overflow tubes 1300. Here, a length of two bars constituting a cross of the cross-shaped escape-prevention plate 1320 may be greater than a distance between the catching jaws 1203 formed on the facing side plates 1205. Accordingly, the escape-prevention plate 1320 may be inserted between the overflow tubes 1300 and seated on the catching jaws 1203.

Although the escape-prevention plate 1320 is shown and described as being the cross-shaped plate suitable for insertion between the overflow tubes 1300 in the fifth embodiment of the present invention, unlike the above configuration, it is possible to manufacture the escape-prevention plate 1320 in various shapes.

Accordingly, the water culture block 1500 according to the fifth embodiment of the present invention may press roots of a plant received in the receiving space stably using the escape-prevention plate 1320 to prevent the plant from escaping.

Meanwhile, when the water culture blocks 1500 according to the fifth embodiment of the present invention are stacked, the water culture block 1500 may not be disposed below a bottom of the water culture block 1500 disposed at an upper side. In this case, water or a culture solution falling from the overflow tube 1300 of the water culture block 1500 disposed at the upper side may fall onto the ground.

In order to prevent this, when no water culture block is disposed at a lower side, the overflow tube 1300 of the water culture block 1500 disposed at the upper side may further include an overflow tube plug 1350 to block the overflow tube 1300, as shown in FIG. 15.

The overflow tube plug 1350 may include a rod-shaped closing portion 1352 to be inserted into a hollow portion of the overflow tube 1300, and a head 1354 for inserting or separating the closing portion 1352 into or from the hollow portion of the overflow tube 1300.

Meanwhile, the water culture block 1500 according to the fifth embodiment of the present invention may further include a discharge hose 1330 for discharging a fluid flowing out of the overflow tube 1300 to the outside.

That is, when the water culture blocks 1500 according to the present embodiment are stacked, the discharge hose 1330 may delivery a fluid flowing out of the water culture block 1500 disposed at an upper side to the water culture block 1500 disposed at a lower side.

In addition, in this embodiment, the discharge hose 1330 is coupled to the overflow tube 1300 in a state in which the discharge hose wraps around a lower portion of the overflow tube 1300. However, the present invention is not limited thereto, and the discharge hose may be inserted into and coupled to the hollow portion of the overflow tube 1300.

The above discharge hose 1330 may be in the form of a tube formed of a flexible material such as vinyl, rubber, or the like. When the water culture blocks 1500 are stacked, the discharge hose may deliver a fluid to a water culture block 1500 which is in contact with a lower end thereof, or, when desired, a length of this discharge hose may be extended to deliver the fluid to one of the desired water culture blocks 1500 disposed at a lower side.

Figure 18:
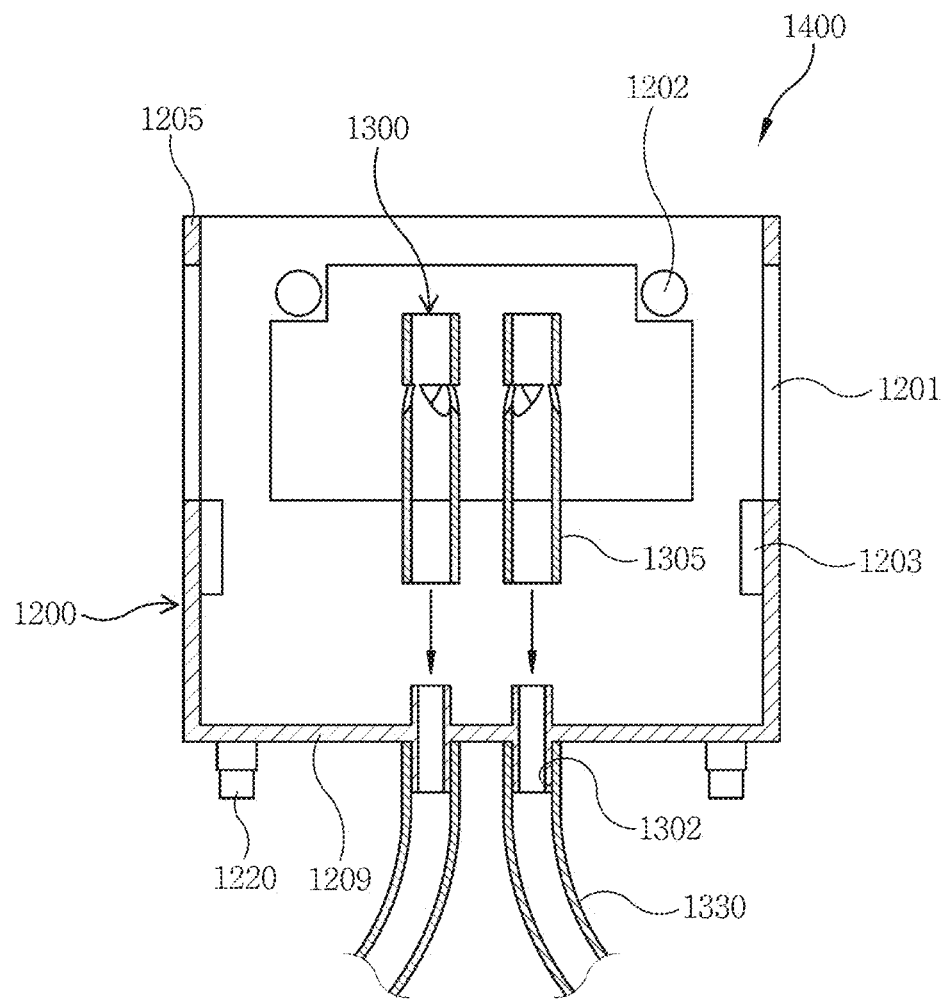
FIG. 18 is a longitudinal sectional view of a water culture block according to a sixth embodiment of the present invention.

FIG. 18 is a longitudinal sectional view of a water culture block according to a sixth embodiment of the present invention. A water culture block 1400 according to the sixth embodiment of the present invention is substantially the same as the water culture block 1500 according to the fifth embodiment of the present invention shown in FIGS. 15 to 17 except a coupling structure of the overflow tube 1300. Therefore, overlapping descriptions for the same configurations will be omitted, and the same terms and the same reference numerals will be given to the same configurations.

Referring to FIG. 18, the overflow tube 1300 coupled to the block body 1200 includes a first overflow unit 1302 and a second overflow unit 1305. In the sixth embodiment of the present invention, the first overflow unit 1302 and the second overflow unit 1305 may be formed of a rigid synthetic resin material or a flexible synthetic resin material.

The first overflow unit 1302 is formed to pass through the bottom plate 1209 of the block body 1200, and the first overflow unit 1302 is formed in a pipe shape. A part of the first overflow unit 1302 protrudes from a lower surface of the bottom plate 1209, and a part of the first overflow unit 1302 protrudes from an upper surface of the bottom plate 1209.

The second overflow unit 1305 is disposed at an inner side of the block body 1200, and the second overflow unit 1305 is formed in a pipe shape which is coupled to the first overflow unit 1302 protruding from the upper surface of the bottom plate 1209.

The first overflow unit 1302 and the second overflow unit 1305 may be coupled to each other in an interference fitting manner, but the first and second overflow units 1302 and 1305 may also be coupled to each other in a screw-coupling manner. However, the present invention is not limited thereto, and the first and second overflow units 1305 and 1305 may be formed integrally with each other according to a process unit price. The block body 1200 and the first and second overflow units 1302 and 1305 may be formed integrally with each other.

By forming the first and second overflow units 1302 and 1305 to be mutually disassemblable and assemblable, it is possible to exchange only broken part even when any one of the first and second overflow units 1302 and 1305 is broken.

Figure 19:
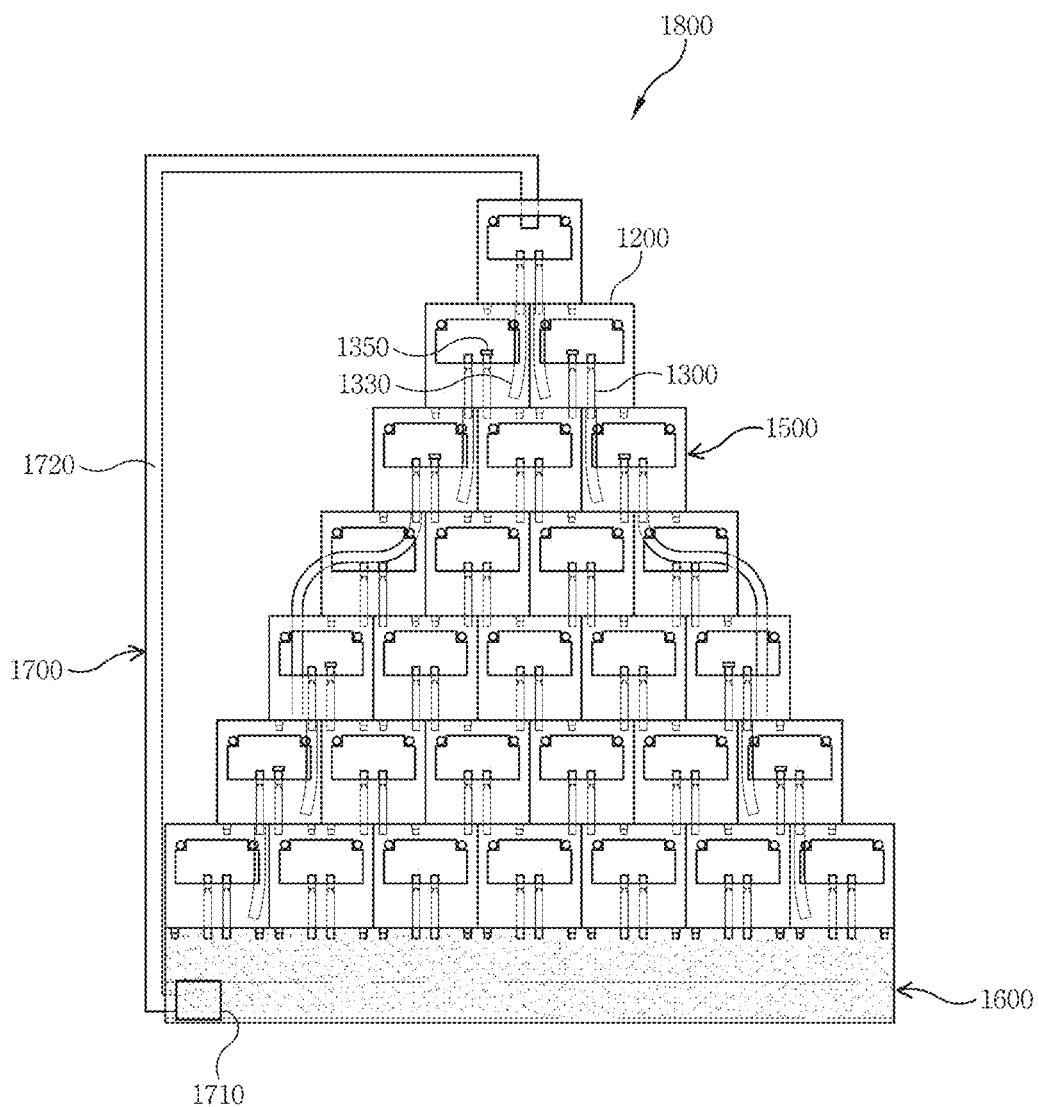
FIG. 19 is a side view illustrating a water culture device according to the third embodiment of the present invention.

FIG. 19 is a side view illustrating a water culture device according to the third embodiment of the present invention.

Referring to FIG. 19, a water culture device 1800 includes the water culture block 1500, a water reservoir 1600, and a circulation unit 1700.

The plurality of water culture blocks 1500 are stacked, and the water culture blocks 1500 may be stacked in a wide variety of forms.

The water culture blocks 1500 may be stacked in the form of a wall, may be stacked to form an empty space at a central portion, or may be stacked in the form of wall having an empty space formed at a central portion thereof. In addition, the plurality of water culture blocks 1500 may be stacked such that a part thereof overlaps so that it is possible to stack the water culture blocks in various forms such as a three-dimensional shape or the like.

In addition, the water culture blocks 1500 are coupled to each other by the engagement protrusions 1220 and the overflow tubes 1300.

Here, the water culture blocks 1500 disposed at a relatively lower side may receive a fluid from the water culture blocks 1500 disposed at a relatively upper side through the discharge hose 1330.

Here, the water culture block 1500 disposed at the lower side may be supplied with the fluid from any one of the water culture blocks 1500 disposed at the upper side through adjusting a length of the discharge hose 1330 even when the water culture block 1500 which is disposed at the upper side and is in contact therewith does not provide the fluid.

The water reservoir 1600 is disposed below a lowermost water culture block among the stacked water culture blocks 1500, and the water reservoir 1600 serves to store the fluid such water or a culture solution to be provided to the water culture blocks 1500.

The circulation unit 1700 includes a pump 1710 and a supply hose 1720.

The pump 1710 may be disposed inside the water reservoir 1600 or outside the water reservoir 160, and the pump 1710 pumps the water or culture solution in the water reservoir 1600.

The water or culture solution pumped from the inside of the water reservoir 1600 through the supply hose 1720 is provided to the uppermost water culture block 1500 of the stacked water culture blocks 1500, and is then sequentially supplied to the culture blocks 1500 disposed at a lower side through the overflow tube 1300 and the discharge hose of the uppermost water culture block 1500.

Meanwhile, the water culture device 1800 may further include a fish tank which is disposed in the middle of the water culture blocks 1500, has an overflow tube and a side plate with a small opening or no opening, and is enables fish to be raised in place of an aquatic plant.

That is, at least one of the water culture blocks 1500 may act as a fish tank, and excrement of fish living in the fish tank is delivered to the water culture blocks 500 located at a lower side through the discharge hose 1330 so that the excrement can serve as fertilizer in addition to allowing oxygen to be supplied to water or a culture fluid which is being circulated to help water-quality improvement.

Accordingly, the water culture device 1800 according to the present embodiment allows a plant and fish to coexist and can be maintained without a purification device for water quality improvement.

The water culture device 1800 according to the third embodiment of the present invention allows water culturing to be performed more easily and cleanly, allows water culture blocks to be stacked in multiple stages, may be applied to an art wall used on a wall or to a room wall or may be embodied with a three-dimensional shape, and may individually provide a plant into to each of the blocks stacked in multiple stages.

The water culture device 1800 according to the third embodiment of the present invention includes the discharge hose 1330 connected to a lower portion of the overflow tube 1300 to discharge a fluid flowing out of the block body 1200 through the overflow tube 1300 to the outside so that, when the water culture blocks are stacked in multiple stage, it is possible to provide the fluid flowing out of the upper water culture block 1500 to the desired water culture block 1500 of the water culture blocks 1500 located at a lower side.

Accordingly, it is possible to adjust a fluid flow in a desired direction in the water culture device 1500 so that the unused water culture block 1500 may be used for other purposes.

A water culture device according to the fourth embodiment of the present invention will be described below.

Figure 20:
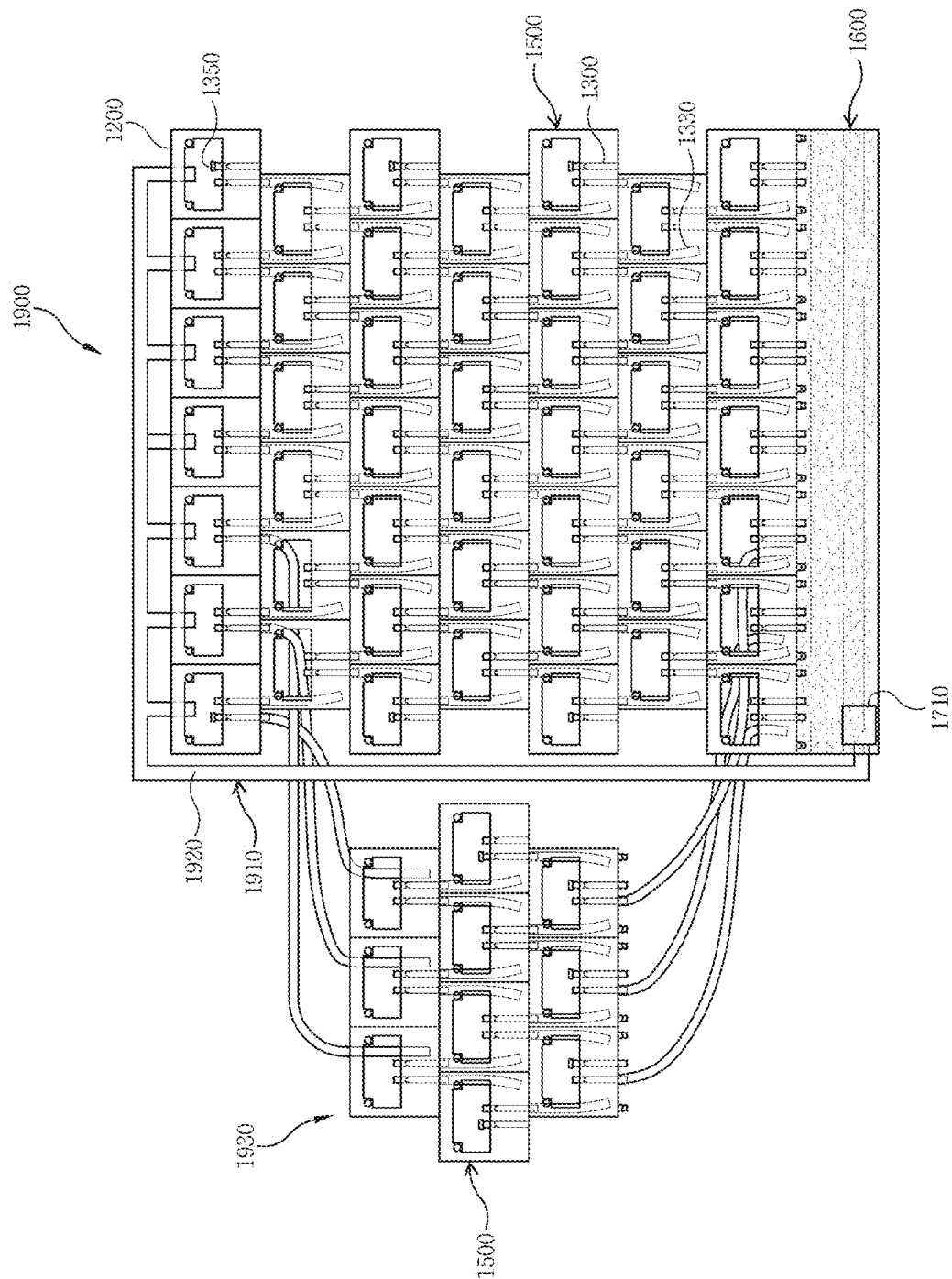
FIG. 20 is a side view illustrating a water culture device according to the fourth embodiment of the present invention.

Meanwhile, FIG. 20 is a side view illustrating the water culture device according to the fourth embodiment of the present invention. Except a circulation unit 1910, a water culture device 1900 according to the fourth embodiment has a configuration which is substantially the same as that of the water culture device 1800 according to the third embodiment described above. Therefore, overlapping descriptions for the same configurations will be omitted, and the same terms and the same reference numerals will be given to the same configurations.

Referring to FIG. 20, the water culture device 1900 according to the fourth embodiment of the present invention includes the water culture block 1500, the water reservoir 1600, and the circulation unit 1910.

Here, the water culture device 1900 according to the fourth embodiment of the present invention may be formed so that the plurality of water culture blocks 1500 are cross-arranged in the form of a matrix. At this time, the circulation unit 1910 enables provision of water or a culture solution pumped through the supply hose 1920 from inside the water reservoir 1600 to each of the plurality of uppermost water culture blocks 1500 of the stacked water culture blocks 1500.

In other words, the supply hose 1920 may divided in the form in which the hose is branched to correspond to the number of the plurality of water culture blocks 1500 disposed at the uppermost stage to supply the water or culture solution to each of the plurality of the uppermost water culture blocks 1500.

In addition, the water culture device 1900 according to the fourth embodiment of the present invention may be connected to another water culture device 1930 adjacent thereto via the discharge hose 1330 to allow the plurality of water culture devices 1900 and 1930 to be employed via one circulation unit 1910.

In the water culture device 1900 according to the fourth embodiment of the present invention as described above, and the plurality of water culture devices 1900 and 1930 may be arranged in a desired form through the one circulation unit 1910 and the discharge hoses 1330.

Meanwhile, the embodiments disclosed in the drawings are merely specific examples presented to facilitate the understanding of the present invention, and are not intended to limit the scope of the present invention. It should be apparent to those skilled in the art that, in addition to the embodiments disclosed herein, other modifications based on the technical spirit of the present invention may be implemented.

What is claimed is:
1. A water culture block comprising:
a block body including a bottom plate and a plurality of side plates coupled to and surrounding the bottom plate, wherein each of the plurality of side plates has a side-plate opening substantially extending the width of each side plate and elevated from the bottom plate such that the bottom plate and the plurality of side plates together form a water receiving space below the side-plate opening;
a water tray body located over the bottom plate, the plurality of side plates, and the side-plate openings;
a through hole formed through the water trap body and configured to drain water from the water tray body;
a pipe in fluid communication with the through hole and extending downwardly from the water tray body, wherein a lower end portion of the pipe contacts the bottom plate to support the water tray body on the bottom plate, and wherein the pipe comprises a water-drain opening at the lower end portion to drain water from the through hole to the water receiving space; and
at least one overflow tube extending through the bottom plate and comprising an upper tube portion extending upwardly from the bottom plate and a lower tube portion extending downwardly from the bottom plate, wherein a top edge of the upper tube portion extends to a height above the water receiving space, wherein the upper tube portion comprises an upper opening formed at a level below the side-plate opening and over the bottom plate for receiving water overflow from the water receiving space, and wherein the lower tube portion comprises a lower opening located at a level below the bottom plate for draining the water overflow.
2. The water culture block of claim 1, wherein the water tray body is assembled in or disassembled from inside the block body.
3. The water culture block of claim 1, wherein the at least one overflow tube comprises;
a plurality of first overflow tubes disposed on the bottom plate in two rows along a first direction; and
a plurality of second overflow tubes disposed on the bottom plate in two rows along a second direction crossing the first direction.
4. The water culture block of claim 3, wherein the upper opening of the upper tube portion of the at least one overflow tube comprises a pair of oblique line-shaped or V-shaped cut-out portions to allow water to flow into the overflow tube.
5. The water culture block of claim 1, wherein the water tray body comprises a water tray bottom plate disposed to face the bottom plate, wherein the at least one overflow tube comprises a plurality of overflow tubes disposed in the form of a matrix at a central portion of the bottom plate, and wherein the water tray bottom plate is formed in the shape of a rectangular band and has an opening through which the plurality of overflow tubes disposed on the central portion of the bottom plate are exposed.
6. The water culture block of claim 1, wherein the water tray body comprises a water tray bottom plate disposed to face the bottom plate, wherein the at least one overflow tube comprises a plurality of overflow tubes disposed on the bottom plate in the form of a cross, and wherein the water tray bottom plate covers the plurality of overflow tubes and has a plurality of openings formed thereon.
7. The water culture block of claim 1, wherein the water tray body comprises a water tray bottom plate having a plate shape and disposed to face the bottom plate, and wherein a side surface of the water tray bottom plate is in contact with an inner surface of each of the side plates.
8. The water culture block of claim 1, further comprising a plurality of engagement protrusions protruding from an outer surface of the bottom plate.
9. The water culture block of claim 1, wherein the at least one overflow tube comprises a plurality of overflow tubes, and wherein the water culture block further comprises an escape-prevention plate inserted between the plurality of overflow tubes and configured to press roots of a plant received in the receiving space to prevent an escape of the plant.
10. The water culture block of claim 1, further comprising a connection string connecting a pair of through holes formed at both sides of the side-plate opening.
11. The water culture block of claim 1, wherein the block body has a regular hexahedron shape or a rectangular parallelepiped shape.
12. The water culture block of claim 1, wherein the at least one overflow tube comprises a plurality of overflow tubes, and wherein the water culture block further comprises an overflow tube plug comprising a closing portion configured to be inserted into any one of the plurality of overflow tubes to block the plurality of overflow tubes, and a head formed on an upper end of the closing portion.
13. The water culture block of claim 1, wherein the overflow tube comprises;
a first overflow unit having a hollow portion formed therein and passing through the bottom plate of the block body; and
a second overflow unit assembled to the first overflow unit.
14. The water culture block of claim 1, wherein the pipe comprises;
a first pipe coupled to a lower surface of the water tray body corresponding to the through hole; and
a second pipe assembled to the first pipe.
15. A water culture device comprising:
a plurality of stacked water culture blocks each comprising:

a block body including a bottom plate and a plurality of side plates coupled to and surrounding the bottom plate, wherein each of the plurality of side plates has a side-plate opening substantially extending the width of each side plate and elevated from the bottom plate such that the bottom plate and the plurality of side plates together form a water receiving space below the side-plate opening;

a water tray body located over the bottom plate, the plurality of side plates, and the side-plate openings;

a through hole formed through the water trap body and configured to drain water from the water tray body;

a pipe in fluid communication with the through hole and extending downwardly from the water tray body, wherein a lower end portion of the pipe contacts the bottom plate to support the water tray body on the bottom plate, and wherein the pipe comprises a water-drain opening at the lower end portion to drain water from the through hole to the water receiving space; and at least one overflow tube extending through the bottom plate and comprising an upper tube portion extending upwardly from the bottom plate and a lower tube portion extending downwardly from the bottom plate, wherein a top edge of the upper tube portion extends to a height above the water receiving space, wherein the upper tube portion comprises an upper opening formed at a level below the side-plate opening and over the bottom plate for receiving water overflow from the water receiving space, and wherein the lower tube portion comprises a lower opening located at a level below the bottom plate for draining the water overflow;

a water reservoir disposed at a lowermost water culture block of the water culture blocks and configured to store the fluid; and a circulation unit comprising a pump configured to pump the fluid in the water reservoir and a hose connected to the pump to provide the fluid pumped by the pump to an uppermost water culture block of the water culture blocks.

16. The water culture device of claim 15, further comprising a fish tank disposed between the water culture blocks and having an overflow tube formed on a bottom plate thereof.

* * * * *